US008218457B2

United States Patent
Malhotra et al.

(10) Patent No.: US 8,218,457 B2
(45) Date of Patent: Jul. 10, 2012

(54) APPARATUS AND METHOD FOR PROVIDING COMMUNICATION SERVICES USING MULTIPLE SIGNALING PROTOCOLS

(75) Inventors: Tanu Malhotra, Singapore (SG); Krishna Anoop Kumar, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 1423 days.

(21) Appl. No.: 10/953,193

(22) Filed: Sep. 29, 2004

(65) Prior Publication Data

US 2005/0286496 A1    Dec. 29, 2005

Related U.S. Application Data

(60) Provisional application No. 60/583,657, filed on Jun. 29, 2004.

(51) Int. Cl.
*H04Q 11/00* (2006.01)

(52) U.S. Cl. ........................................ 370/260; 370/352

(58) Field of Classification Search ............... 370/395.5, 370/395.52, 466–469, 401, 260–271, 62, 370/360, 352–356; 379/93.21, 158, 202, 379/202.01–206.01
See application file for complete search history.

(56) References Cited

U.S. PATENT DOCUMENTS

| 5,898,676 | A  | * | 4/1999  | Apfelbeck et al. ............ 370/260 |
| 6,304,648 | B1 | * | 10/2001 | Chang ..................... 379/202.01 |
| 6,584,093 | B1 | * | 6/2003  | Salama et al. ................. 370/351 |
| 6,657,992 | B1 | * | 12/2003 | Christie, IV ................. 370/352 |
| 7,089,285 | B1 | * | 8/2006  | Drell .............................. 709/204 |
| 7,302,050 | B1 | * | 11/2007 | Michalewicz ........... 379/202.01 |
| 7,356,586 | B1 | * | 4/2008  | Sajina et al. .................. 709/224 |
| 7,701,926 | B2 | * | 4/2010  | Gavish et al. ................. 370/352 |
| 2002/0018464 | A1 | * | 2/2002 | Kikinis ......................... 370/352 |
| 2002/0059404 | A1 | * | 5/2002 | Schaaf et al. ................. 709/220 |
| 2002/0126626 | A1 | * | 9/2002 | Singh et al. .................... 370/260 |
| 2003/0002478 | A1 | * | 1/2003 | El-Gebaly et al. ............ 370/352 |
| 2003/0072421 | A1 | * | 4/2003 | Hosomi ....................... 379/67.1 |
| 2003/0081594 | A1 | * | 5/2003 | Lee ................................ 370/353 |
| 2003/0112947 | A1 | * | 6/2003 | Cohen ...................... 379/202.01 |
| 2003/0138108 | A1 | * | 7/2003 | Gentle ............................ 381/23 |
| 2003/0169859 | A1 | * | 9/2003 | Strathmeyer et al. ....... 379/88.17 |
| 2004/0165709 | A1 | * | 8/2004 | Pence et al. ............. 379/201.01 |
| 2005/0094580 | A1 | * | 5/2005 | Kumar et al. ................. 370/260 |

* cited by examiner

*Primary Examiner* — Mohammad S Elahee
*Assistant Examiner* — Akelaw Teshale

(57) ABSTRACT

An apparatus includes a plurality of call controllers that are capable of establishing a plurality of communication sessions over a packet network using a plurality of signaling protocols. The apparatus also includes an application controller that is capable of supporting one or more supplementary services during each of the communication sessions. As particular examples, the application controller and at least one of the call controllers are capable of at least one of: placing at least one of the communication sessions on hold so a user may initiate another of the communication sessions, placing at least one of the communication sessions on hold so the user may accept another of the communication sessions, and establishing a conference using at least two of the communication sessions. The communication sessions may use a common signaling protocol or different signaling protocols.

31 Claims, 9 Drawing Sheets

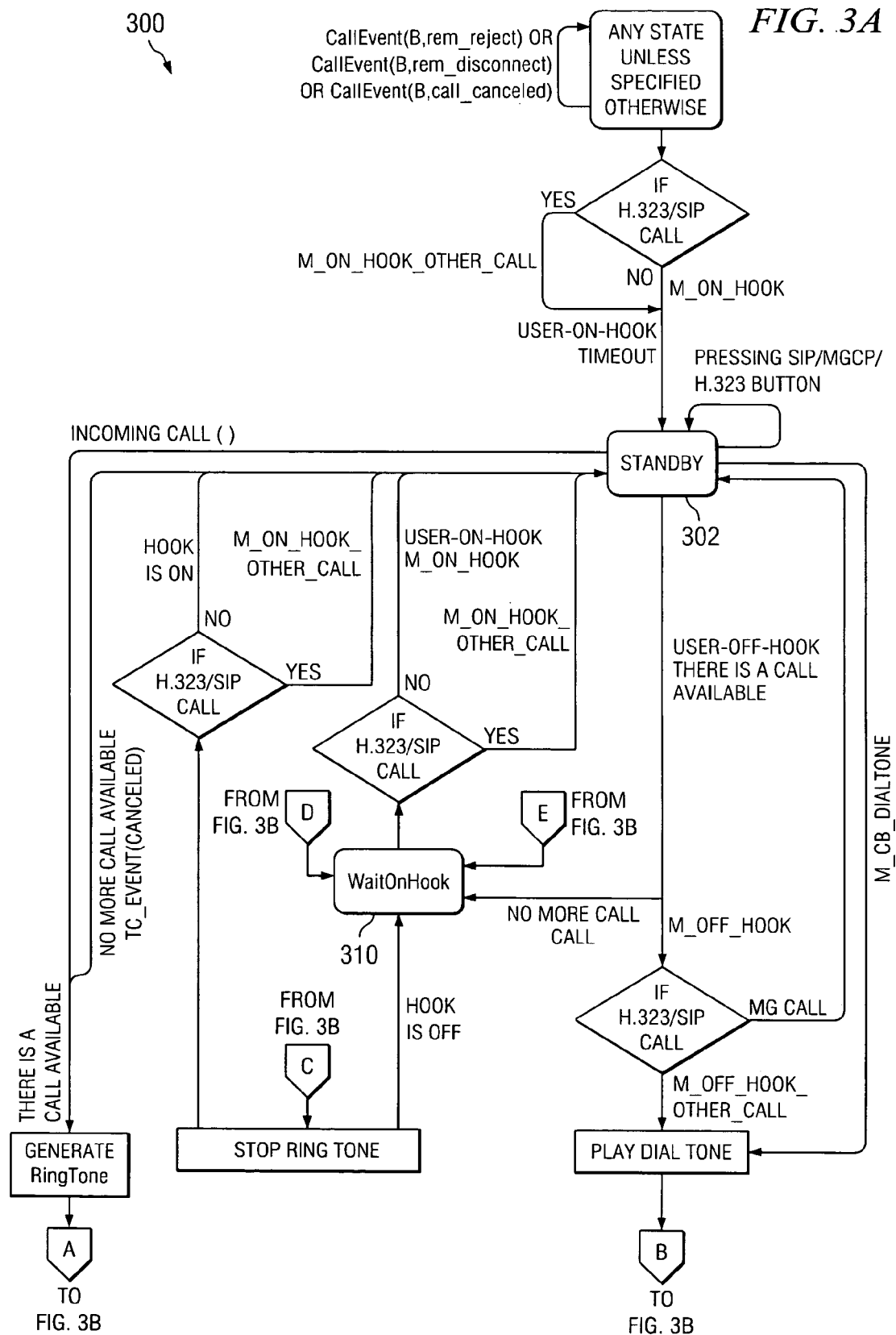

APPARATUS AND METHOD FOR PROVIDING COMMUNICATION SERVICES USING MULTIPLE SIGNALING PROTOCOLS

CROSS REFERENCE TO RELATED APPLICATIONS

This patent application claims priority under 35 U.S.C. §119(e) to U.S. Provisional Patent Application No. 60/583,657 filed on Jun. 29, 2004, which is hereby incorporated by reference.

TECHNICAL FIELD

This disclosure is generally directed to communication systems and more specifically to an apparatus and method for providing communication services using multiple signaling protocols.

BACKGROUND

Packet-based voice communication services are becoming more and more popular in the United States and around the world. Packet-based voice services, often referred to as voice-over-Internet Protocol (VoIP) services, allow voice communications to occur over packet networks. This typically allows packet networks to provide both voice and data services to customers.

Many different signaling protocols have become standard for VoIP services. The H.323 protocol, the Session Initiation Protocol (SIP), and the Media Gateway Control Protocol (MGCP) are several examples. While it would be highly desirable for all networks to use the same protocol, many different networks supporting different protocols are already in use.

The availability of multiple protocols presents various problems for businesses and other organizations. For example, integrating networks that use different protocols may require the use of protocol translators. However, protocol translation often lacks established and accepted standards, so protocol translators often operate in different ways. Other approaches, such as Time Division Multiplexing (TDM) techniques, could be used to interconnect networks, but this typically introduces latency. Also, an organization could move all of its products and services to a single protocol, but this would limit connectivity to other networks. Finally, product manufacturers are often forced to develop products that function in single-protocol and multi-protocol environments, which increases the cost and time needed to develop the products.

SUMMARY

This disclosure provides an apparatus and method for providing communication services using multiple signaling protocols.

In one aspect, an apparatus includes a plurality of call controllers that are capable of establishing a plurality of communication sessions over a packet network using a plurality of signaling protocols. The apparatus also includes an application controller that is capable of supporting one or more supplementary services during each of the communication sessions.

In particular aspects, the application controller and at least one of the call controllers are capable of at least one of: placing at least one of the communication sessions on hold so a user may initiate another of the communication sessions, placing at least one of the communication sessions on hold so the user may accept another of the communication sessions, and establishing a conference using at least two of the communication sessions.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIGS. 3A and 3B illustrate an example user interface control state machine according to one embodiment of this disclosure;

DETAILED DESCRIPTION

Figure 1:
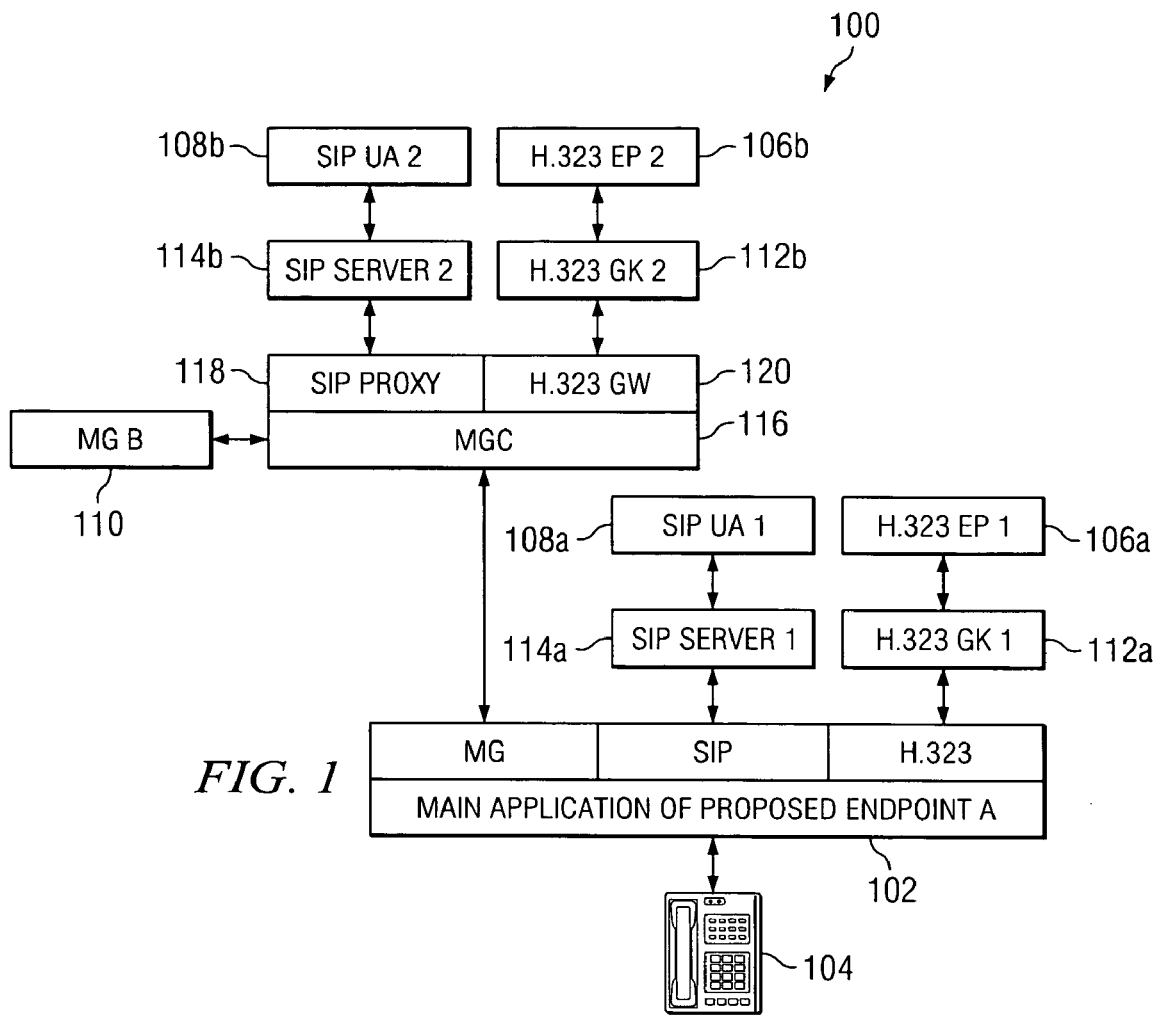
FIG. 1 illustrates an example communication system according to one embodiment of this disclosure.

FIG. 1 illustrates an example communication system 100 according to one embodiment of this disclosure. The embodiment of the system 100 shown in FIG. 1 is for illustration only. Other embodiments of the system 100 may be used without departing from the scope of this disclosure.

In this example, the system 100 includes an endpoint 102. The endpoint 102 provides voice and/or other communication services to a user in the system 100. For example, the endpoint 102 may allow a user to use a telephone 104 to communicate over a packet network. The endpoint 102 includes any hardware, software, firmware, or combination thereof for facilitating communications over a packet network. Also, the telephone 104 includes any hardware, software, firmware, or combination thereof for transmitting and receiving audio information, such as a fixed or wireless telephone or a computing device with a microphone and speaker. In addition, the endpoint 102 and the telephone 104 could be integrated into a single unit, such as an Internet Protocol (IP) telephone.

The endpoint 102 supports communication services using multiple signaling protocols. In this example, the endpoint 102 supports the H.323, SIP, and MGCP signaling protocols. Other or additional protocols could also be supported by the endpoint 102. In some embodiments, the endpoint 102 provides only a single channel into a packet network, and communications using all protocols are transported over that channel. Because the endpoint 102 supports multiple signaling protocols, the endpoint 102 may be described as support a multi-signaling protocol architecture.

In the illustrated example, the system 100 also includes various H.323 endpoints (EPs) 106a-106b, SIP user agents (UAs) 108a-108b, and a media gateway (MG) 110. The H.323 endpoints 106a-106b, SIP user agents 108a-108b, and media gateway 110 represent additional endpoints in the system 100. For example, these endpoints could be used by parties who place telephone calls to the endpoint 102 or who receive telephone calls from the endpoint 102. The parties using these endpoints may be referred to as remote parties and/or calling or called parties (depending on the situation). Each of these endpoints includes any hardware, software, firmware, or combination thereof for supporting communication services. In this example, each of the H.323 endpoints 106a-106b, SIP user agents 108a-108b, and media gateway 110 is capable of providing communication services using a single protocol. However, any number of endpoints in the system 100 could support multiple signaling protocols, whether or not those endpoints operate in the same manner as the endpoint 102.

In this example, the system 100 further includes H.323 gatekeepers (GKs) 112a-112b, SIP servers 114a-114b, a media gateway controller (MGC) 116, a SIP proxy 118, and an H.323 gateway (GW) 120. The H.323 gatekeepers 112a-112b facilitate communication with the H.323 endpoints 106a-106b. For example, the H.323 endpoints 106a-106b may each register with one of the H.323 gatekeepers 112a-112b before receiving service. The SIP servers 114a-114b facilitate communication with the SIP user agents 108a-108b. The media gateway controller 116 facilitates communication with the media gateway 110. The SIP proxy 118 and the H.323 gateway facilitate communication between the media gateway controller 116 and the H.323 gatekeeper 112b and the SIP server 114b. This represents one example of the topology of the system 100. Other topologies could be used in the system 100.

The various components shown in FIG. 1 may communicate with one another over one or more packet networks. The one or more packet networks may communicate Internet Protocol (IP) packets, frame relay frames, Asynchronous Transfer Mode (ATM) cells, or other suitable information between network addresses. Also, the one or more packet networks may include one or more local area networks (LANs), metropolitan area networks (MANs), wide area networks (WANs), all or a portion of a global network such as the Internet, or any other communication system or systems at one or more locations. In addition, the one or more packet networks may operate according to any appropriate type of protocol or protocols, such as Ethernet, IP, X.25, frame relay, or any other protocol.

The following represents one example implementation of the system 100. This implementation is for illustration only. Other implementations of the system 100 may be used without departing from the scope of this disclosure. In the example implementation, the H.323 endpoints 106a-106b use NetMeeting, and the SIP user agents 108a-108b represent Pingtel xpressa software evaluation versions. The H.323 gatekeepers 112a-112b represent Cisco 2600 series devices. The SIP servers 114a-114b and the media gateway controller 116 are implemented using Linux. The telephone 104 represents a normal four-wire analog phone.

In one aspect of operation, the endpoint 102 is registered with the H.323 gatekeeper 112a, the SIP server 114a, and the media gateway controller 116 at the same time. This allows the endpoint 102 to receive service using all three protocols (H.323, SIP, and MGCP). For example, the endpoint 102 could simultaneously handle telephone calls from multiple endpoints that support different signaling protocols.

As particular examples, the endpoint 102 could establish a telephone call with one of the endpoints, such as the SIP user agent 108a. The endpoint 102 could place the SIP user agent 108a on hold and place or receive a telephone call from a media gateway 110. The endpoint 102 could also establish a conference call involving endpoints using one or multiple signaling protocols, such as when the endpoint 102 establishes a conference call involving the SIP user agent 108a and the media gateway 110. In addition, if the endpoint 102 is currently receiving service using one of the protocols, other endpoints may attempt to call the endpoint 102 using the same or different signaling protocol. When this happens, the endpoint 102 may produce a call waiting tone, and the user decides whether to accept the incoming call. In this way, the other endpoints placing the incoming calls may call the endpoint 102 and are not simply denied service with a busy signal. In this way, the endpoint 102 may receive various services using any suitable signaling protocol.

By operating in this way, calls involving endpoints that use different protocols may be established with less delay. For example, if an H.323 endpoint calls a SIP user agent, an interworking unit (IWU) is typically needed to implement a bridge between the H.323 and SIP call setup signaling. The interworking unit often needs to implement an ASN.1 encoder/decoder as well as an augmented Backus-Naur form (ABNF) encoder/decoder. For SIP messages, the interworking unit decodes ABNF messages and encodes them as ASN.1 messages for transmission to the H.323 endpoint. Similarly, for H.323 messages, the interworking unit decodes ASN.1 messages and encodes them as ABNF messages for transmission to the SIP user agent. Apart from this processing delay, there could be network delay depending on the physical location of the interworking unit, and call setup itself depends on the availability of the interworking unit. The use of the endpoint 102 in the system 100 may reduce or eliminate the need for an interworking unit.

Moreover, even if one of the services in the system 100 becomes inoperable, the endpoint 102 may still operate using the other services. For example, if the media gateway controller 116 becomes inoperable, the endpoint 102 could still communicate using the SIP and H.323 protocols. Further, the endpoint 102 provides supplementary or value-added services (such as call waiting, call hold, and call conferencing) to the user. These services could be provided regardless of the protocol or protocols supported by other endpoints in the system 100. In addition, protocol translators may not be needed in the system 100.

While the above description has described the endpoint 102 as establishing or receiving telephone calls using multiple protocols, the endpoint 102 could also establish or receive multiple telephone calls using the same protocol. For example, the endpoint 102 could establish and/or receive multiple H.323 telephone calls. Also, while this document may describe the use of a "telephone" involved in "telephone calls" or "calls," any communication device could be used in the system 100 to initiate or receive any suitable type of communication session. The communication session could involve voice, data, video, or any other or additional content. Because of this, the endpoint 102 and/or telephone 104 could be replaced by and/or incorporated into other devices, such as a computing device or a videophone.

Although FIG. 1 illustrates one example of a communication system 100, various changes may be made to FIG. 1. For example, the system 100 could include any number of endpoints, telephones, gatekeepers, servers, gateways, and proxies. Also, the system 100 could include components that support other or additional signaling protocols. In addition, each of the various other endpoints in the system 100 could support a single protocol or multiple protocols.

Figure 2:
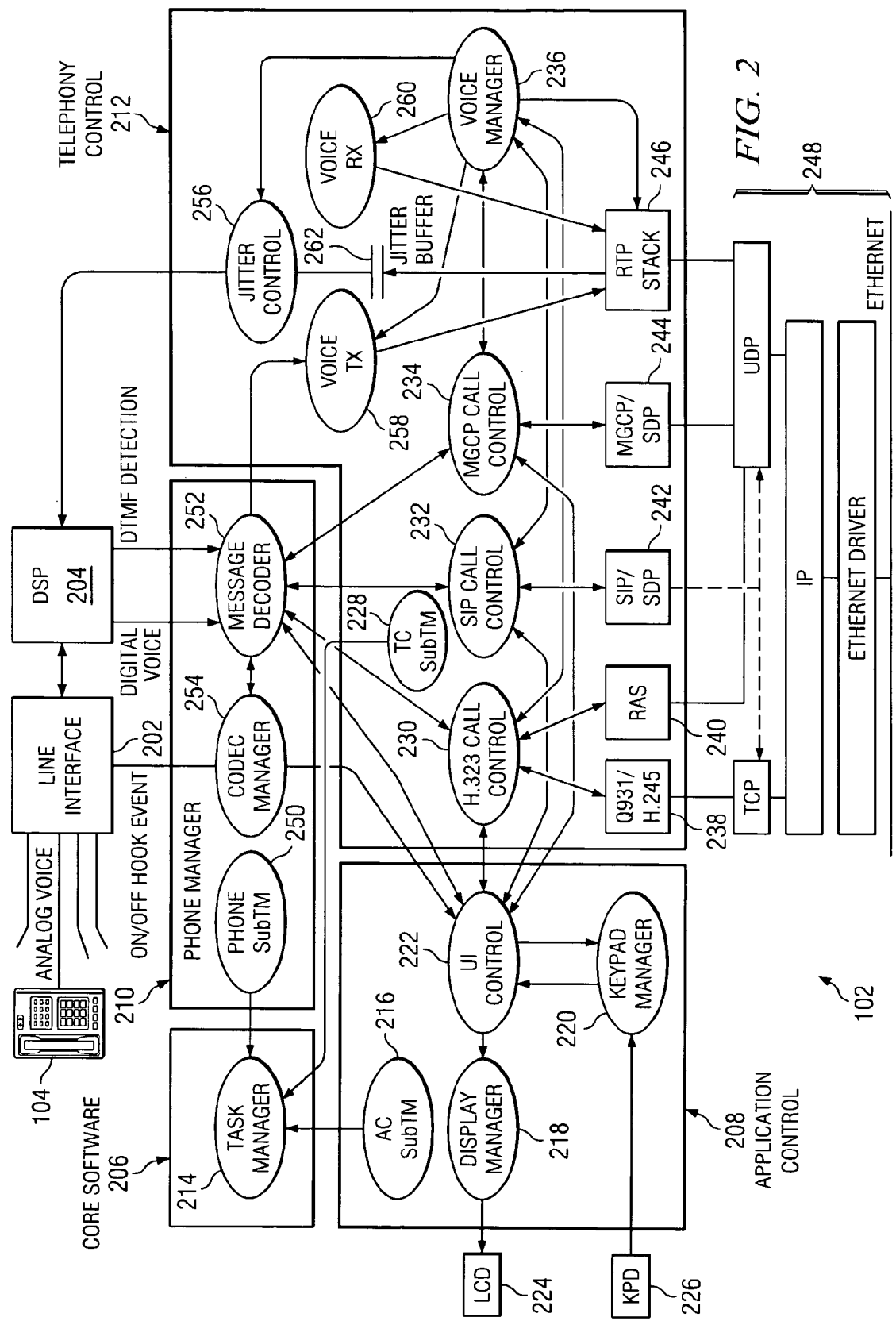
FIG. 2 illustrates an example endpoint supporting multiple signaling protocols according to one embodiment of this disclosure.

FIG. 2 illustrates an example endpoint 102 supporting multiple signaling protocols according to one embodiment of this disclosure. The embodiment of the endpoint 102 shown in FIG. 2 is for illustration only. Other embodiments of the endpoint 102 may be used without departing from the scope of this disclosure. Also, for ease of explanation, the endpoint 102 is described as operating in the system 100 of FIG. 1. The endpoint 102 could be used in any other suitable environment.

In this example, the endpoint 102 includes a line interface 202. The line interface 202 acts as an interface to one or more communication lines. For example, the line interface 202 could act as an interface to one or more analog communication lines coupled to one or more telephones 104. In this document, the term "couple" and its derivatives refer to any direct or indirect communication between two or more elements, whether or not those elements are in physical contact with one another. The line interface 202 includes any suitable structure for coupling the endpoint 102 and one or more communication lines.

A digital signal processor (DSP) 204 is coupled to the line interface 202. The DSP 204 supports various functions in the endpoint 102. For example, the DSP 204 may perform dual-tone multi-frequency (DTMF) detection to detect when a user presses buttons on the telephone 104. The DSP 204 could also generate dial tones, call waiting warning signals, and other audible signals perceptible to the user of the telephone 104. The DSP 204 could further support one or more voice codecs used to compress and decompress voice data. The DSP 204 represents any suitable processing device.

As shown in FIG. 2, the endpoint 102 also includes core software 206, application control software 208, phone manager software 210, and telephony control software 212. The various software 206-212 represents any suitable instructions capable of being executed by one or more processors.

A task manager 214 represents the main controller of the endpoint 102. The task manager 214 is capable of triggering execution of and otherwise controlling the other software 208-212 in the endpoint 102. For example, the task manager 214 could launch various subtask managers (SubTMs) in the endpoint 102, which are used to control the software 208-212 of the endpoint 102. As a particular example, the task manager 214 could launch an application control (AC) subtask manager 216, a telephony control (TC) subtask manager 228, and a phone subtask manager 250. The task manager 214 could also initialize and start various drivers needed to communicate over a packet network, such as Ethernet drivers 248.

The application control subtask manager 216 is capable of launching a display manager 218, a keypad manager 220, and a user interface (UI) control module 222. The display manager 218 controls the operation of a display of the endpoint 102, such as a liquid crystal display (LCD) 224 or other display. The keypad manager 220 controls the operation of an input device of the endpoint 102, such as a keypad 226 or other device. As a particular example, the keypad manager 220 may manage DTMF events detected by the phone manager software 210 and request that the phone manager software 210 detect DTMF tones. The user interface control module 222 controls the operation of the display manager 218 and the keypad manager 220.

The telephony control subtask manager 228 is capable of launching various call control modules that support different signaling protocols in the endpoint 102. In this example, the call control modules include an H.323 call control module 230, a SIP call control module 232, and a MGCP call control module 234. The telephony control subtask manager 228 is also capable of launching a voice manager 236. The call control modules 230-234 may represent separate threads initiated by the telephony control subtask manager 228. The call control modules 230-234 support communication sessions that are established and controlled using different signaling protocols. In this example, the protocols include H.323, SIP, and MGCP, although any other or additional protocols could also be used.

The call control modules 230-234 also interact with various stacks 238-246. The stacks 238-246 represent any suitable mechanism for facilitating the transfer of information, such as memory registers, queues, and other memory arrangements. In this example, the stacks include a Q.931/H.245 stack 238, a Remote Access Service (RAS) stack 240, a SIP/Session Description Protocol (SDP) stack 242, a MGCP/SDP stack 244, and a Realtime Transfer Protocol (RTP)/Real-Time Control Protocol (RTCP) stack 246. The stacks 238-240 are used by the H.323 call control module 230, the stack 242 is used by the SIP call control module 232, and the stack 244 is used by the MGCP call control module 234. The stack 246 is used to transport voice data. The stacks 238-246 facilitate communication over a communication link, such as an Ethernet link, through various drivers 248.

In some embodiments, the user interface control module 222 includes a message queue that checks for messages from the call control modules 230-234 and from a message decoder 252. The call control modules 230-234 implement their respective signaling protocols (H.323, SIP, and MGCP) using one or more Application Programming Interfaces (APIs) provided by the stacks 238-246. Also, any messages received by the stacks 238-246 may be provided to the call control modules 230-234 using a callback function. A callback function pointer is registered to a corresponding stack at the time of initializing and starting an instance of the stack. This callback function may be implemented in the call control module of the respective stack. In addition, the endpoint 102 may include buttons (such as on a keypad 226) that allow the user to select whether to place an H.323, SIP, or MGCP call. The user selects one of these buttons, and the user interface control module 222 uses this selection to identify the call control module 230-234 to handle the call.

The phone subtask manager 250 launches the message decoder 252 and a codec manager 254. The phone subtask manager 250 also tests an interface to the DSP 204. The message decoder 252 has an interface to the user interface control module 222 and to the call control modules 230-234. The message decoder 252 dispatches messages either to the DSP 204 or to the codec manager 254. The codec manager 254 passes commands to the line interface 202 to perform specific functions, such as ringing a telephone 104, start voice processing, play DTMF tones, tune a gain (voice volume) of the telephone 104, and identify codec events such as hook movements. The message decoder 252 also provides messages from the DSP 204 to the corresponding software modules in the endpoint 102. For example, when receiving voice data for delivery over a network, the message decoder 252 could facilitate communication of the voice data from the DSP 204 to the telephony control software 212 for communication through the RTP stack 246.

The voice manager 236 in the telephony control software 212 initiates a jitter control module 256, a voice transmit (Voice TX) module 258, and a voice receive (Voice RX) module 260. The jitter control module 256 controls the operation of a jitter buffer 262. The jitter buffer 262 places received RTP packets in order, such as an order based on a time stamp and a sequence number of the RTP packets, before passing the packets to the DSP 204 for decoding. The voice transmit module 258 is capable of waking the RTP stack 246 each time a voice packet is received from the DSP 204 and schedule transmission of the voice packets. The voice receive module 260 is capable of waking the RTP stack 246 at specified intervals, such as every 10 ms, and schedule reception of voice packets. This allows the endpoint 102 to handle voice packets up to the rate of one RTP packet every 10 ms, although other time interval(s) could be used.

The operation of the user interface control module 222 and the call control modules 230-234 are shown in FIGS. 3-5, which are described below. The following description represents one possible implementation of the endpoint 102. This example implementation is for illustration only. Other embodiments of the endpoint 102 could be used without departing from the scope of this disclosure.

In an example implementation, the endpoint 102 includes an ARM7TDMI core and a DSP core. Voice vocoders are implemented on the DSP 204. The stacks 238-246 represent reentrant stacks implemented on an ARM7 microcontroller. The RTP stack 246 supports multiple instances using the same task.

The stacks 238-240 register to a fixed or discovered gatekeeper 112a and listen for incoming H.323 calls (SETUP messages) on port number 1720. The stack 242 uses the Transmission Control Protocol (TCP) and/or the User Datagram Protocol (UDP). The stack 242 registers with the SIP server 114a at port number 5060 and listens for incoming SIP calls (INVITE messages) at port number 5060. The stack 244 registers with the media gateway controller 116 at port number 2427 and listens for signals from the media gateway controller 116 at port number 2427.

An IP address of the endpoint 102 is same for the registrations to the H.323 gatekeeper 112a, the SIP server 114a, and the media gateway controller 116. An H.323 alias, SIP phone name, or media gateway endpoint name is set to aaln/1. An E164 alias can be set to any number, and the same number could be used to register with the H.323 gatekeeper 112a, the SIP server 114a, and the media gateway controller 116. If the same number is used, when the endpoint 102 registers with the H.323 gatekeeper 112a and the SIP server 114a, the endpoint 102 uses the number assigned by the media gateway controller 116. This number should be accepted by the H.323 gatekeeper 112a and the SIP server 114a. If it is not, the endpoint 102 may have to use three different numbers for the three protocols. The endpoint 102 also ensures that there is no clash between the port numbers used by the stacks 238-246.

The call control modules 230-234 call the stack APIs and start the instances of their associated stacks with appropriate initializations. The stacks 238-246 are implemented such that when a call control module starts an instance of a stack, a pointer to a callback function is passed to the stack. These callback functions receive all the messages and callback data from the associated stack. The callback messages for the stacks are kept as similar as possible so that the implementation of the callback function is simpler.

As a particular example of implementing the endpoint 102, the endpoint 102 could initially represent a single-protocol device, such as an H.323 device. To provide the multi-protocol functionality described above, the stacks 242-244 and the call control modules 232-234 could be implemented in the device. These could be implemented in software on the device. In this particular example, other components such as the RTP stack 246 and the functionality of the DSP 204 may need no or minimal changes. As a result, the hardware of the device may remain the same. The only cost increase may be due to the increased memory needed for the additional software.

Although FIG. 2 illustrates one example of an endpoint 102 supporting multiple signaling protocols, various changes may be made to FIG. 2. For example, the functional division within the software 206-212 shown in FIG. 2 is for illustration only. Various modules of the software 206-212 could be combined or omitted and additional modules could be added according to particular needs. Also, although the endpoint 102 is described as using various software 206-212, the functions provided by the software 206-212 could also be implemented using any hardware, software, firmware, or combination thereof.

Figure 3B:
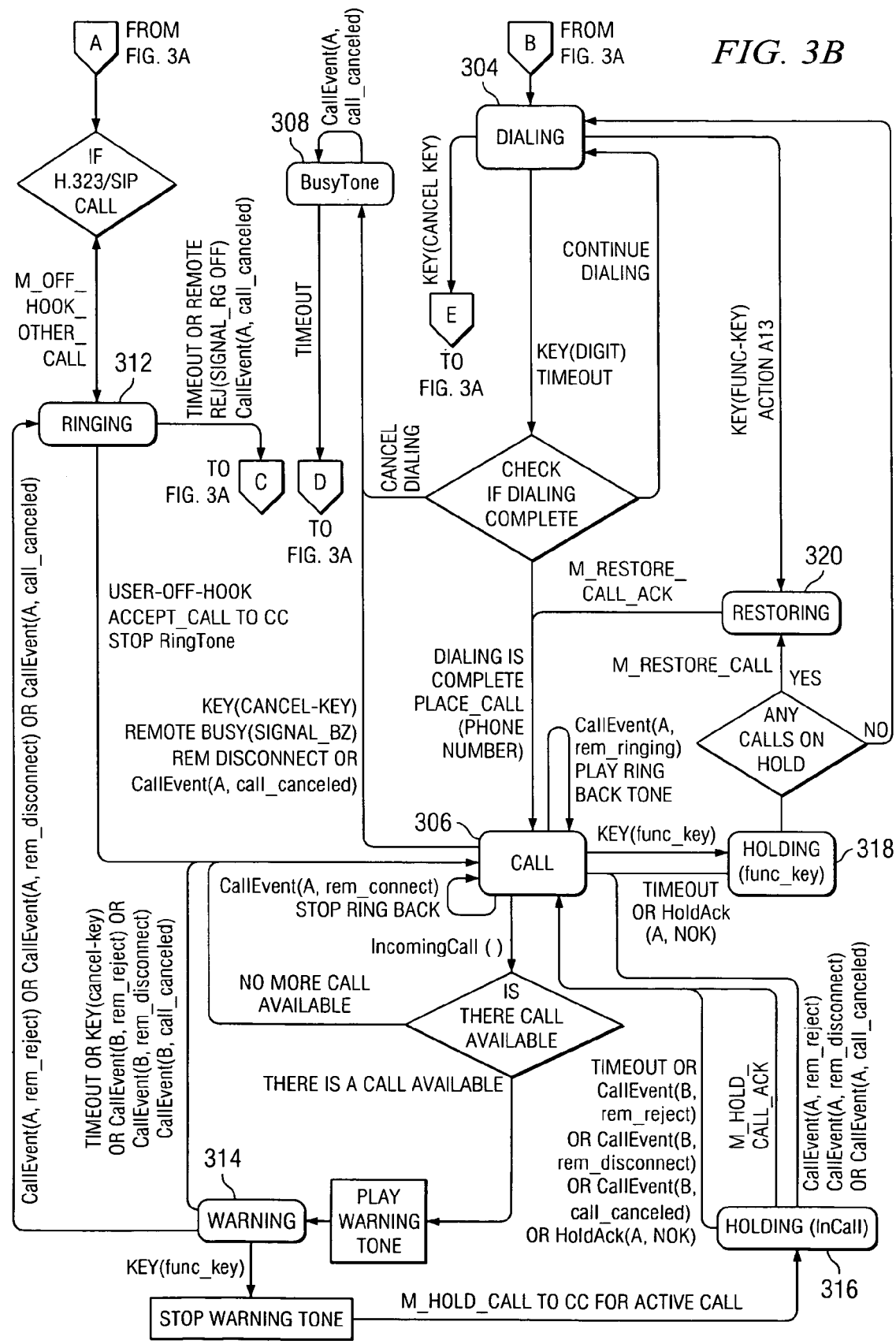

FIGS. 3A and 3B illustrate an example user interface control state machine 300 according to one embodiment of this disclosure. In particular, FIGS. 3A and 3B illustrate a state machine 300 used by the user interface control module 222 in the endpoint 102 of FIG. 2. The state machine 300 shown in FIGS. 3A and 3B is for illustration only. Other embodiments of the state machine 300 may be used without departing from the scope of this disclosure. Also, for ease of explanation, the state machine 300 is described with respect to the endpoint 102 of FIG. 2. The state machine 300 could be used by any other suitable device.

In a Standby state 302, a user may press a button indicating whether an outgoing call is an H.323, SIP, or MGCP call. When the user goes off-hook (picks up the telephone 104) for the outgoing call, the user interface control module 222 checks if there is a call available. For example, the endpoint 102 could allow one or multiple calls to exist simultaneously, and the user interface control module 222 determines if the number of existing calls is less than a maximum number of calls.

If there is a call available, the user interface control module 222 sends an M_OFF_HOOK message to the appropriate call control module 230-234. The "appropriate" call control module represents the call control module associated with the selected type of outgoing call. The user interface control module 222 then checks if the call being made is an H.323 or a SIP call. If it is, the user interface control module 222 sends a M_CB_DIALTONE message, and the endpoint 102 plays a dial tone and enables DTMF detection. This causes a state change from the Standby state 302 to a Dialing state 304, where the user may dial a telephone number.

If the call being made is an MGCP call, a dial tone is not immediately played. The MGCP call control module 234 waits for messages in its message queue. On reception of the M_OFF_HOOK message from the user interface control module 222, the MGCP call control module 234 sends an OFF_HOOK event (EVENT_HD) to the media gateway controller 116 and waits for a response from the media gateway controller 116. On receiving the EVENT_HD event from the endpoint 102, the media gateway controller 116 responds by playing a dial tone signal (SIGNAL_DL). A callback function implemented in the MGCP call control module 234, upon detecting the SIGNAL_DL (ON) from the media gateway controller 116 through the stack 244, sends a M_CB_DIAL-TONE message to the user interface control module 222. That message is sent to the message decoder 252 and then to the DSP 204, which causes the DSP 204 to play a dial tone and enable DTMF detection. Again, the state changes from the Standby state 302 to the Dialing state 304.

At this stage, the user dials a telephone number of a called party using the keypad 226. DTMF tones are detected by the DSP 204 and sent to the message decoder 252 and then to the user interface control module 222 (if DTMF detection is enabled). In some embodiments, dialing may be completed when the user enters the telephone number, followed by the pound sign ("#").

If this call represents an H.323 or SIP call and the user cancels dialing or takes an unusually long time to dial the telephone number, the state 304 times out and changes to a Busy Tone state 308. In the Busy Tone state 308, a busy tone is played to the user. If the call is an MGCP call, the timeout is ignored since the playing of busy tone is governed by commands from the media gateway controller 116. Once in the Busy Tone state 308 and after a timeout, the busy tone is stopped, and the state changes to a Wait On Hook state 310. In the Wait On Hook state 310, the endpoint 102 waits for the user to go on-hook (puts the telephone 104 down). When the user goes on-hook, the state machine 300 resets to the Standby state 302.

Once dialing is complete, the state changes to a Call state 306, where the outgoing call is placed. A PLACE_CALL message is sent to the appropriate call control module 230-234 with the telephone number to be called. The user interface control module 222 receives an indication that the called party's endpoint is ringing. For example, the user interface control module 222 may receive a CallEvent(A,rem_ringing) message or a <PROTOCOL>_CBKMSG_RINGING message indicating that the called party's endpoint is ringing. At this point, ring back tone is played for the user.

If the called party answers, the endpoint 102 receives a far end connect message, the ring back tone is stopped, the state remains in the Call state 306, and the user starts talking to the called party. If the called party's endpoint is busy, the endpoint 102 enters the Busy Tone state 308. A busy tone is played until a timeout, after which the state machine 300 enters the Wait On Hook state 310. This could also happen if the called party's endpoint disconnects.

In the case of an incoming call (such as when an H.323 SETUP message, SIP INVITE message, or MGCP Create Connection (CRCX)+Ringer Signal ON message is received), a <PROTOCOL>_CBKMSG_INCOMING is sent to the callback function in the appropriate call control module 230-234. An Incoming Call message is forwarded to the user interface control module 222. If there is any free call available, ring tone is generated, the number of free calls available is decremented (or set to zero if only one call is allowed), and the state changes from the Standby state 302 to a Ringing state 312. Also, the endpoint 102 displays any available caller identification information on the display 224. If the number of available calls available is already zero, the endpoint 102 remains in the Standby state 302. A TC_EVENT(cancelled) message is sent to the appropriate call control module 230-234 to cancel the call.

If the incoming call is an H.323 or SIP call, an M_OFF_HOOK_OTHER_CALL message is sent to the MGCP call control module 234. In some embodiments, the endpoint 102 can handle only one call at a time, and this message informs the MGCP call control module 234 that a call using another protocol is being established.

From the Ringing state 312, the state may change to the Standby state 302 after ringing is stopped due to a timeout (call is not accepted) or a remote call rejection (calling party hangs up). If the user goes off-hook, an ACCEPT_CALL message is sent to the appropriate call control module 230-234. On receiving a M_CB_RINGING_OFF, the ringing is stopped, media channels are opened for voice conversation, and the state is changed to the Call state 306. If the calling party hangs up first, the state machine 300 enters the Busy Tone state 308, followed by the Wait On Hook state 310 and the Standby state 302.

When at least one incoming or outgoing call has been established and the state machine 300 is in the Call state 306, the endpoint 102 may receive a new incoming call. When this occurs, the endpoint 102 determines if a call is available. If not, the endpoint 102 remains in the Call state 306, and the new call cannot be answered by the user.

If a call is available, the endpoint 102 plays a call-waiting warning tone to the user and enters a Warning state 314. If the user fails to answer the new call, a timeout occurs, or the new call is terminated by the calling party, the state machine 300 call returns to the Call state 306. Otherwise, if the user answers the new call, the endpoint 102 stops generating the warning tone, and the state machine 300 enters a Holding state 316.

In the Holding state 316, the original call is placed on hold while the user answers the new incoming call. The user interface control module 222 sends a M_HOLD_CALL to the appropriate call control module 230-234 and receives a M_HOLD_CALL_ACK response from the call control module. This places the original call on hold. The new call is connected, and the state machine 300 enters the Call state 306 for the new call.

A call could also be placed on hold by the user pressing a "Hold" button on the endpoint 102. When the user presses the "Hold" button during a call, the state machine 300 changes from the Call state 306 to a Holding state 318. After placing one call on hold, the endpoint 102 determines if there are any other calls that have been placed on hold. If so, the state machine 102 enters a Restoring state 320 and restores the other call, at which point the state machine 300 enters the Call state 306. For example, the user interface control module 222 may send a M_RESTORE_CALL message to the appropriate call control module 230-234 and receive a M_RESTORE_CALL_ACK response once the other call is restored. If no other calls exist when the user presses the "Hold" button, the state machine 300 enters the Dialing state 304. This allows the user to dial a new telephone number and establish a new call.

Although FIGS. 3A and 3B illustrate one example of a user interface control state machine 300, various changes may be made to FIGS. 3A and 3B. For example, other or additional states could be supported in the state machine 300. Also, other or additional triggers could be used to transition between the states in the state machine 300.

Figure 4A:
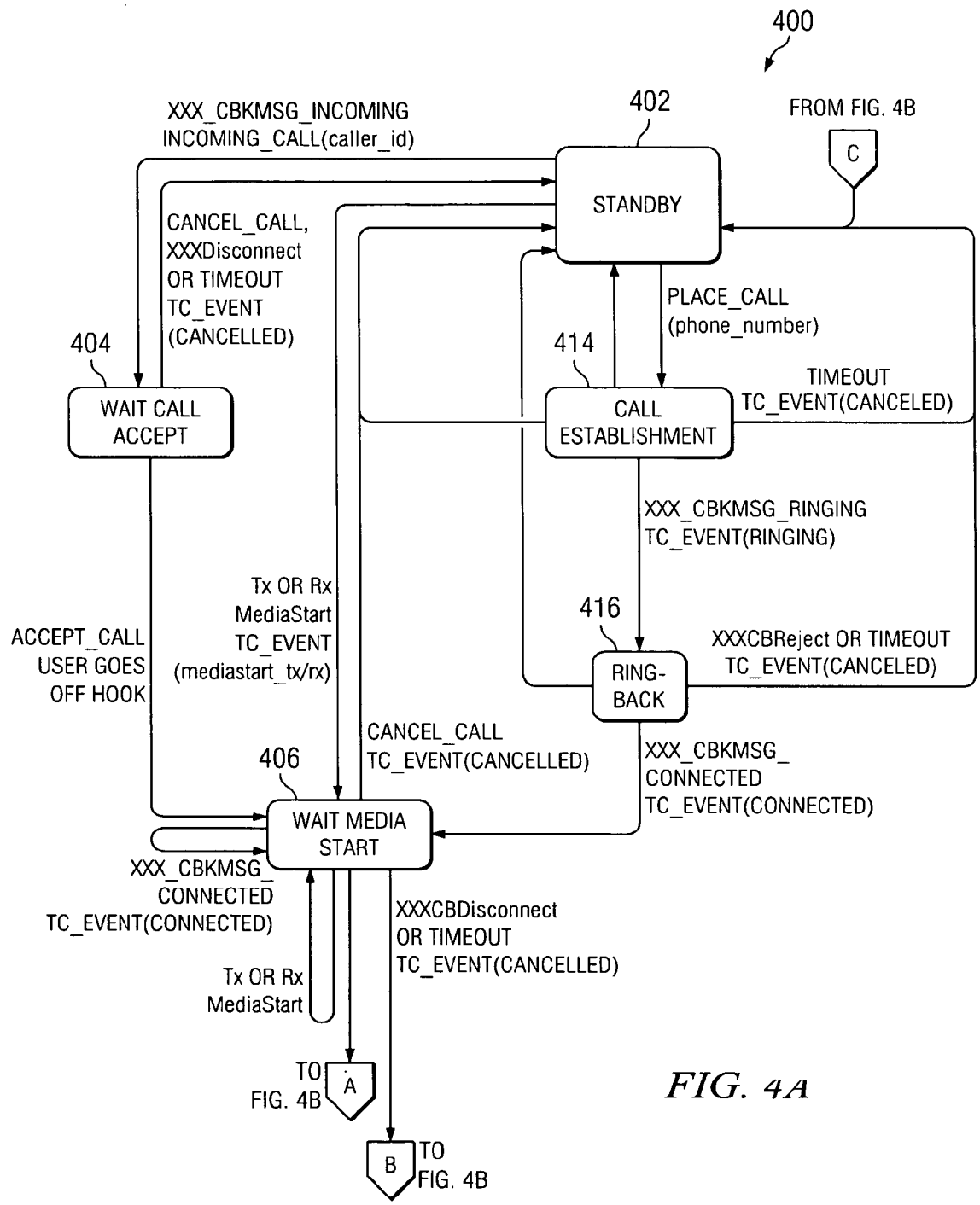
FIGS. 4A and 4B illustrate an example H.323/SIP call control state machine according to one embodiment of this disclosure.
Figure 4B:
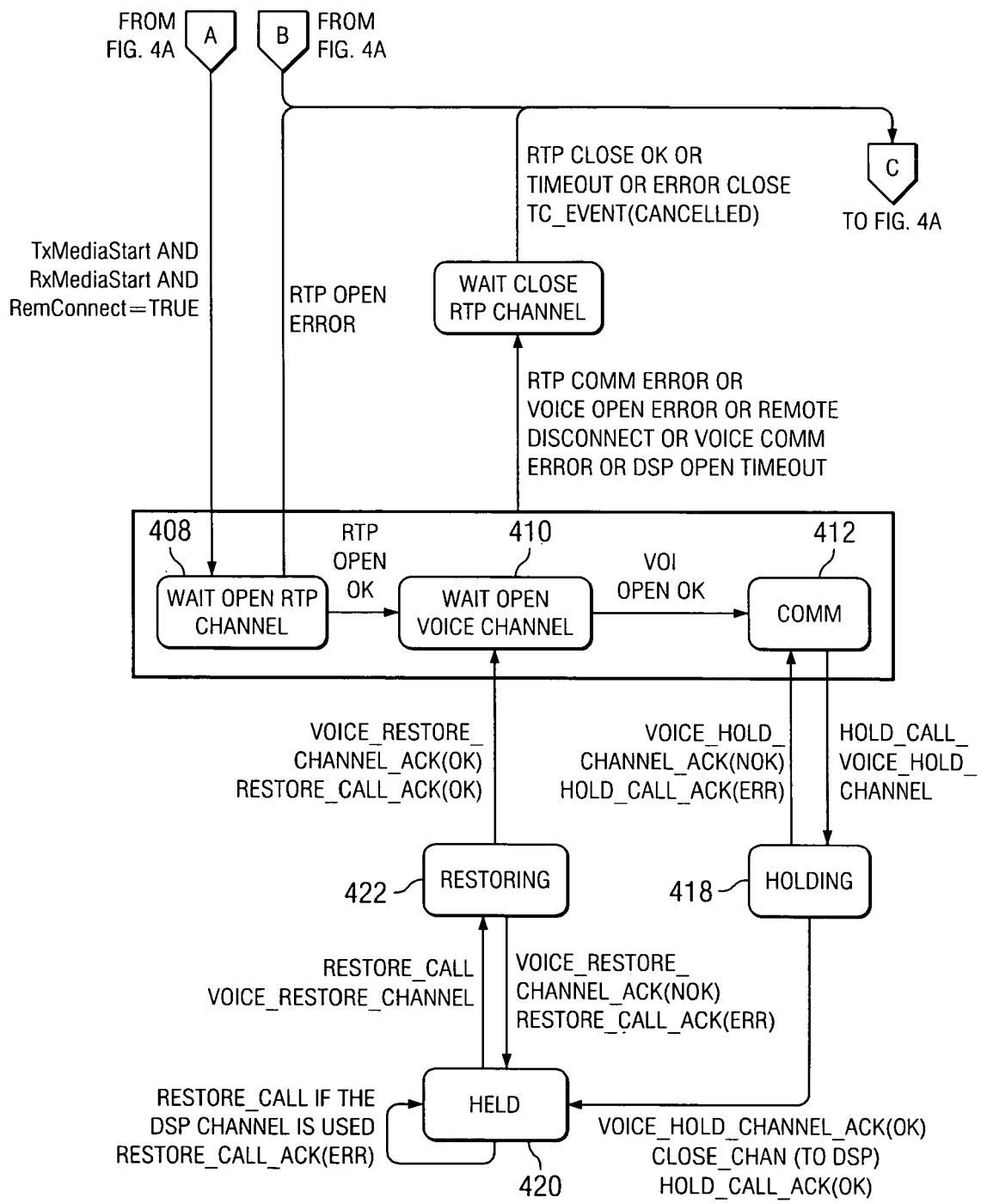

FIGS. 4A and 4B illustrate an example H.323/SIP call control state machine 400 according to one embodiment of this disclosure. In particular, FIGS. 4A and 4B illustrate a state machine 400 used by the H.323 call control module 230 or the SIP call control module 232 in the endpoint 102 of FIG. 2. The state machine 400 shown in FIGS. 4A and 4B is for illustration only. Other embodiments of the state machine 400 may be used without departing from the scope of this disclosure. Also, for ease of explanation, the state machine 400 is described with respect to the endpoint 102 of FIG. 2. The state machine 400 could be used by any other suitable device.

The state machine 400 is initially in a Standby state 402. When there is an incoming call, the state changes to a Wait Call Accept state 404. An Incoming Call message is sent to the message queue in the user interface control module 222. The message includes any caller identification information (if available) associated with the incoming call.

A TC_EVENT(cancelled) message could be received from the user interface control module 222. This means that there is no free call available, and there is already an existing call. If this occurs, the state machine 400 reenters the Standby state 402.

If the call can be accepted, the appropriate call control module 230-232 receives an ACCEPT_CALL message. For example, the AcceptCall API of the appropriate call control module 230-232 could be called to perform the signaling needed to accept the call. As particular examples, a SIP OK message or an H.323 ALERTING/CONNECT message could be provided to the call control module 230-232. The state then changes from the Wait Call Accept state 404 to a Wait Media Start state 406.

In the Wait Media Start state 406, the state machine 400 may receive a callback message for starting media transmit and/or media receive. When media starts for both transmit and receive have been detected, the state machine 400 enters a Wait Open RTP Channel state 408. The media start callback transmit and receive messages may contain parameters such as an IP address of the remote destination, a media type (audio/video), a type of vocoder negotiated, and a packet size. These parameters are passed to the voice manager 236, which calls the relevant APIs to start instances of the RTP stack 246. On successful starting of the RTP instances, the voice manager 236 sends an acknowledgement to the call control module 230-232, and the state changes to a Wait Open Voice Channel state 410. On successful opening of voice channels, the state then changes to a Communication state 412. At this point, the voice call is established.

If a remote disconnect or a cancel call message (endpoint 102 goes on-hook) is received, the state returns to the Standby state 402 after closing the RTP channels. Also, the state machine 400 returns to the Standby state 402 if there are any errors in opening the RTP channels or the voice channels results in the destruction of the RTP stack instances.

When the user places an outgoing telephone call (such as by pressing an H.323 button or a SIP button) using the endpoint 102, the appropriate call control module 230-232 receives a PLACE_CALL message with the called party's telephone number. A CallPlace API in the call control module 230-232 is used to place the outgoing call, and the state changes from the Standby state 402 to a Call Establishment state 414. Ring back tone is played when the called party's endpoint starts ringing, and the state machine 400 enters a Ring Back state 416. Upon reception of the media start callback messages for transmit and receive as explained above, the ring back tone is stopped, and the state changes to the Communication state 412 through the states 408-410. The voice call is then established.

During an established incoming or outgoing call, the user of the endpoint 102 may place the call on hold. This may occur, for example, when the user presses a "Hold" button on the endpoint 102. This causes the state machine 400 to enter a Holding state 418. In the Holding state 418, the endpoint 102 attempts to place the call on hold by closing a voice channel from the remote party. If the endpoint 102 fails to place the call on hold, the state machine 400 returns to the Communication state 412. Otherwise, the state machine 400 enters a Held state 420. At this point, the user may attempt to receive an incoming call or place an outgoing call using a different call control module.

Eventually, the user may attempt to restore the held call. If this is possible, the state machine 400 enters a Restoring state 422, where the endpoint 102 attempts to restore the call that had been placed on hold by reopening the voice channel from the remote party. If successfully restored, the state machine 400 enters the Communication state 412, and the previously held call may continue.

Although FIGS. 4A and 4B illustrate one example of an H.323/SIP call control state machine 400, various changes may be made to FIGS. 4A and 4B. For example, other or additional states could be supported in the state machine 400. Also, other or additional triggers could be used to transition between the states in the state machine 400.

Figure 5A:
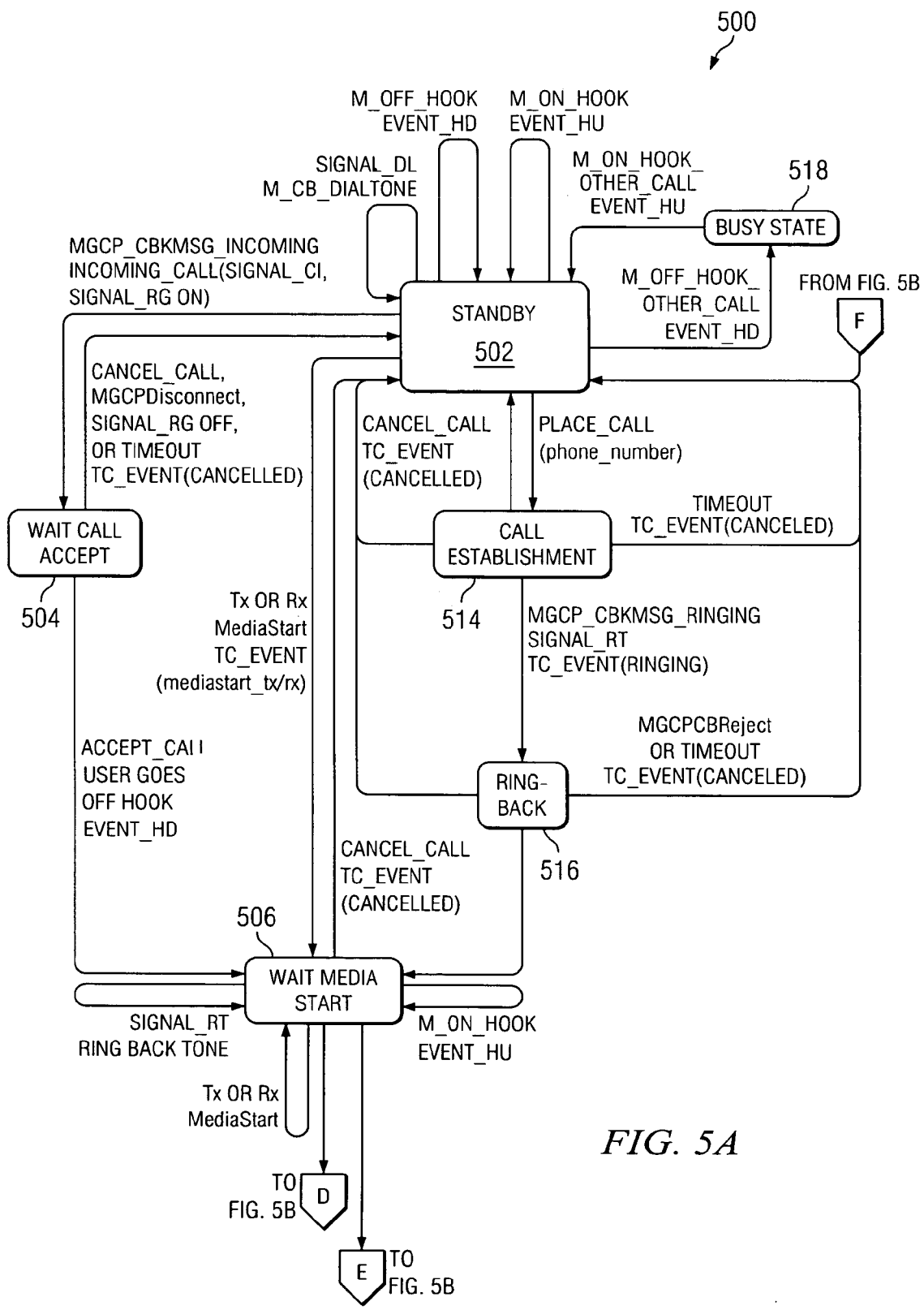
FIGS. 5A and 5B illustrate an example MGCP call control state machine according to one embodiment of this disclosure.
Figure 5B:
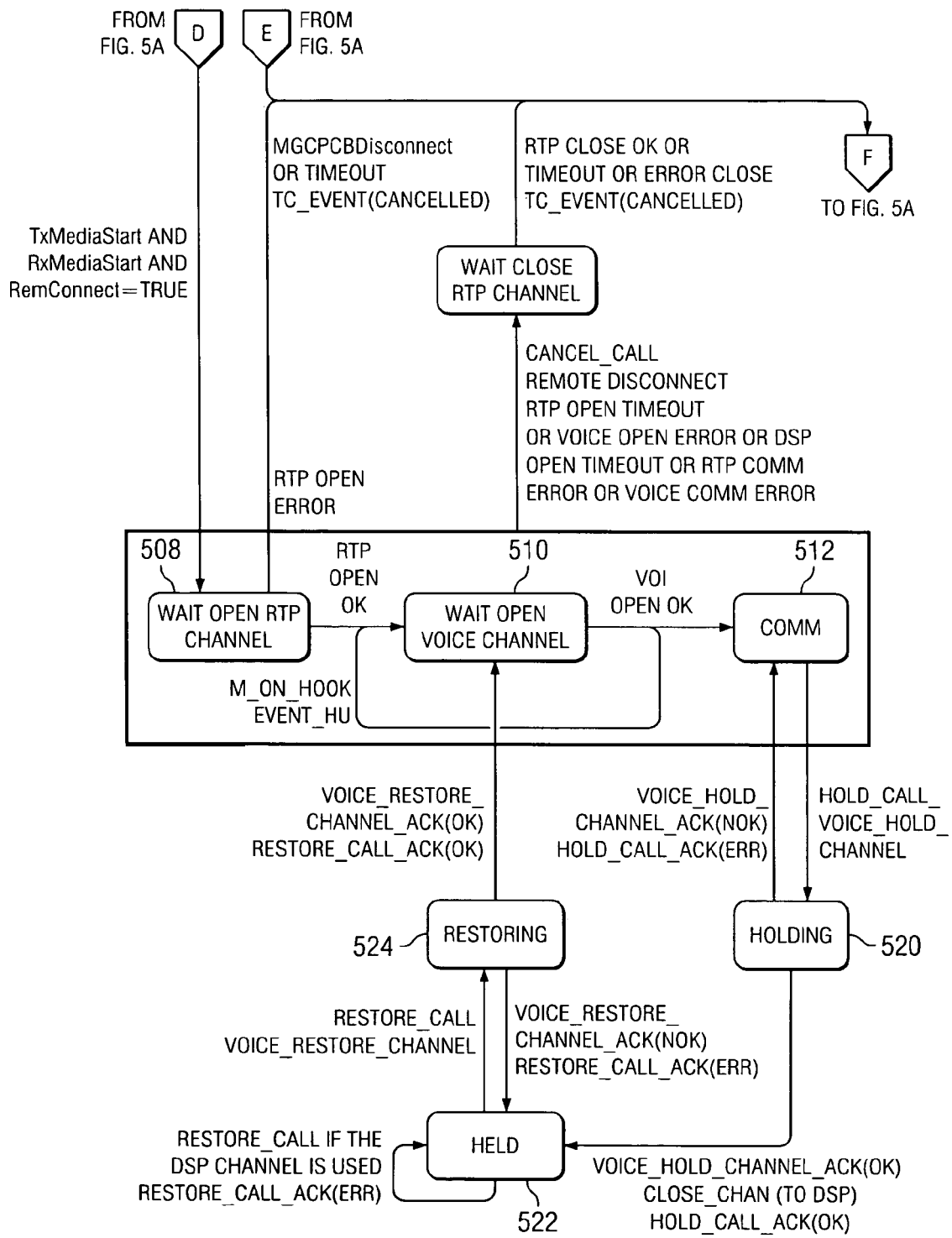

FIGS. 5A and 5B illustrate an example MGCP call control state machine 500 according to one embodiment of this disclosure. In particular, FIGS. 5A and 5B illustrate a state machine 500 used by the MGCP call control module 234 in the endpoint 102 of FIG. 2. The state machine 500 shown in FIGS. 5A and 5B is for illustration only. Other embodiments of the state machine 500 may be used without departing from the scope of this disclosure. Also, for ease of explanation, the state machine 500 is described with respect to the endpoint 102 of FIG. 2. The state machine 500 could be used by any other suitable device.

The state machine 500 is initially in a Standby state 502. An incoming call may be represented as a Create Connection (CRCX) and Ringer (RG) ON message from the media gateway controller 116. An Incoming Call message is sent to the user interface control module 222, and ring tone is played. The state changes from the Standby state 502 to a Wait Call Accept state 504.

If the user goes off-hook to accept the call, an off-hook event (EVENT_HD) is sent to the media gateway controller 116, and the state changes to the Wait Media start state 506. After that, the state machine 500 cycles through states 508-512 by receiving media start callback messages for both transmit and receive and successfully opening instances of the RTP stacks 246 and the voice channels.

When the user wishes to place an outgoing call (such as by pressing a MGCP button) using the endpoint 102, the endpoint 102 goes off-hook. A M_OFF_HOOK event is sent by the user interface control module 222 to the MGCP call control module 234. On reception of the M_OFF_HOOK message, the call control module 234 sends an off-hook event (EVENT_HD) to the media gateway controller 116 and waits for a response.

On receiving the EVENT_HD event from the endpoint 102, the media gateway controller 116 responds by sending a command to play a dial tone signal (SIGNAL_DL) and enabling DTMF detection. The callback function implemented in the MGCP call control module 234, on detecting the SIGNAL_DL (ON) from the stack 244, sends a M_CB_DIALTONE message to the user interface control module 222. The user interface control module 222 provides this message to the DSP 204 through the message decoder 252. The DSP 204 plays the dial tone and enables DTMF detection. The call control module 234 then receives a PLACE_CALL message along with the telephone number when the user completes dialing, and the state changes to a Call Establishment state 514.

Each digit in the telephone number is sent to the media gateway controller 116 as a DTMF event. Once a match for the called party is found at the media gateway controller 116, a Create Connection (CRCX) message is sent to the endpoint 102.

After the called party's endpoint starts ringing, a ring back tone signal (SIGNAL_RT) is sent, which causes ring back tone to be played at the endpoint 102 in a Ring Back state 516. On receiving a media start callback message for transmit and receive, the ring back tone is stopped, and instances of the RTP stack 246 and the voice channels are opened. On successful opening, the state changes to the Communication state 512, and a voice call is established.

After going off-hook to place an outgoing call or after accepting an incoming call, the user can go on-hook in any of the states. As a result, upon receiving a M_ON_HOOK message from the user interface control module 222, the call control module 234 sends an EVENT_HU message to the media gateway controller 116 to reset the state machine at the media gateway controller 116. Also, after establishing a call, if a Delete Connection message is received from the media gateway controller 116, the called party has disconnected, a MGCPCBReject or MGCPCBDisconnect message is sent to the user interface control module 222, and the state machine 500 is reset to the Standby state 502.

As explained above, in some embodiments, the endpoint 102 is capable of supporting only a single call at any given time. If the call control module 234 receives a M_OFF_HOOK_OTHER_CALL message while in any of the states, this means that there is an incoming call callback message received by one of the other call control modules 230-232. Upon receiving this message, the state machine 500 enters into a Busy state 518 and sends an off-hook event (EVENT_HD) to make the media gateway controller 116 believe that the endpoint 102 is busy. For any further MGCP calls destined for the endpoint 102, the media gateway controller 116 responds with a busy signal. When the other call control module 230-232 finishes with the call, a M_ON_HOOK_OTHER_CALL message is sent to the call control module 234. The call control module 234 sends an on-hook event (EVENT_HU) to the media gateway controller 116 so that MGCP calls destined for the endpoint 102 are provided to the endpoint 102. The state then changes back to the Standby state 502.

During an established incoming or outgoing call, the user of the endpoint 102 may place the call on hold. This may occur, for example, when the user presses a "Hold" button on the endpoint 102. This causes the state machine 500 to enter a Holding state 520. In the Holding state 520, the endpoint 102 attempts to place the call on hold. If the endpoint 102 fails to place the call on hold, the state machine 500 returns to the Communication state 512. Otherwise, the state machine 500 enters a Held state 522. At this point, the user may attempt to receive an incoming call or place an outgoing call using a different call control module.

Eventually, the user may attempt to restore the held call. If it is possible, this causes the state machine 500 to enter a Restoring state 524, where the endpoint 102 attempts to restore the call that had been placed on hold. If successfully restored, the state machine 500 reenters the Communication state 512.

Although FIGS. 5A and 5B illustrate one example of a MGCP call control state machine 500, various changes may be made to FIGS. 5A and 5B. For example, other or additional states could be supported in the state machine 500. Also, other or additional triggers could be used to transition between the states in the state machine 500.

Using the various state machines 300-500 shown in FIGS. 3-5, a call can be established, whether incoming or outgoing, using any protocol (H.323/SIP/MGCP). If there is a second call incoming from an endpoint using a different protocol, the endpoint 102 is able to handle it appropriately. In particular, the endpoint 102 allows the user to place the first call on hold and attend to the second call. Also, the user is able to place the second call on hold and restore the first call, and vice versa. In addition, the user is free to place the first call on hold, initiate or accept a second call, and then put all of the parties in a conference. This represents several examples of the functionality of the endpoint 102. Other actions and services could also be provided to the user of the endpoint 102.

While FIGS. 3-5 have separately illustrated the state machines 300-500 for various components in the endpoint 102, the following description describes how the various state machines 300-500 interact with one another and exchange messages. As an example, assume there is an outgoing call from the endpoint 102 to the H.323 endpoint 106a.

To initiate the call at the endpoint 102, the user may press an H.323 button on the endpoint 102 and go off-hook. When the endpoint 102 goes off-hook, the line interface 202 detects the off-hook event and informs the codec manager 254. The codec manager 254 sends an off-hook message to the user interface control module 222. The user interface control module 222, on receiving the off-hook event, checks the call availability status. If there is a free call available, a M_OFF_HOOK message is sent to the H.323 call control module 230, and the number of free calls available is decremented. Also, since this is an H.323 call, dial tone is played immediately to the user, and the state machine 300 enters the Dialing state 304.

In the Dialing state 300, the user interface control module 222 waits for the collection of the called party's telephone number from the user. The user hears the dial tone and starts keying in the telephone number. DTMF events are detected by the DSP 204 and are sent via the message decoder 254 to the user interface control module 222. When the user finishes dialing the telephone number (may be indicated by the "#" key), a PLACE_CALL message is sent to the H.323 call control module 230, and the state machine 300 enters the Call state 306. On receiving the PLACE_CALL message, the state machine 400 of the call control module 230 enters the Call Establishment state 414. If the called party starts ringing (when an H.323 ALERTING message is received from the called party's endpoint), the call control module 230 receives a <PROTOCOL>_CBKMSG_RINGING callback message from the H.323 stacks 238-240.

On receiving this message, the state machine 400 changes to the Ring Back state 416, and a CallEvent(rem_ringing) message is sent to the user interface control module 222. The user interface control module 222, on receiving this message, plays ring back tone. When the media negotiation is over using H.245, media start callback messages for transmit and receive are sent, along with the called party's IP address, port number for the RTP/RTCP session, the encoder/decoder vocoder type, and the packetization size, to open the DSP channels.

On receiving the callback messages for the media, a CallEvent(rem_connect) message is sent to the user interface control module 222 so that the ring back tone can be stopped. The voice manager 236 starts RTP stack instances, and a message is sent to open the DSP channels for particular encoder/decoder type. On receiving the acknowledgement from the DSP 204 for successful opening of the channels, an ACK message is sent to the call control 230 module. Upon receiving the ACK, the call control module 230 changes state, in sequence, to the Communication state 412, and the voice call is established.

During the call, if there is an incoming call from a media gateway, the MGCP protocol stack 244 decodes the CRCX message and any caller identification information. The MGCP call control module 234 receives a MGCP_CBKMSG_INCOMING callback message and changes state to the Wait Call Accept state 504. The MGCP call control module 234 sends an INCOMING_CALL message to the user interface control state machine 300. The user interface control state machine 300, which is in the Call state 306 because of the H.323 call, checks if there is any free call available for the particular channel. If so, the user interface control state machine 300 decrements the number of free calls available. The user interface control state machine 300 also requests the DSP 204 to play a call-waiting warning tone to the user to indicate the reception of a new incoming call. The user interface control state machine 300 changes from the Call state 306 to the Warning state 314.

Upon hearing the warning tone, the user can either ignore it or press a particular button or combination of buttons to accept the new incoming call. If the user ignores the call, the DSP 204 continues to play the warning tone to the user until the calling party cancels or disconnects the call. When the calling party cancels the call, the user interface control state machine 300 returns to the Call state 306, and the warning tone is stopped.

If the user decides to accept the new incoming call, the DSP 204 detects this and informs the user interface control state machine 300. The user interface control state machine 300, on receiving this message, stops the warning tone and sends a M_HOLD_CALL message to the active call control module (which in this example is the H.323 call control module 230). The user interface control state machine 300 also changes from the Warning state 314 to the Holding state 316. When the H.323 call control module 230 receives the M_HOLD_CALL message in the Communication state 412, the call control module 230 sends a M_VOICE_HOLD_CHANNEL message to the voice manager 236 and changes to the Holding state 418.

The voice manager 236, upon receiving this message, closes the jitter buffer 262 for the current call. The voice manager 236 also changes a voicestatus flag to VOICE_STOPPED and a RTPChannelStatus flag to CHANNEL_HELD. In some embodiments, these flags are maintained on a per call basis. Upon successfully closing the jitter buffer 262, the voice manager 236 sends a M_VOICE_HOLD_CHANNEL_ACK message to the H.323 call control module 230. The H.323 call control module 230 receives this message in the Holding state 418 and closes the DSP channel for the current call. The H.323 call control module 230 also changes from the Holding state 418 to the Held state 420 and sends a M_HOLD_CALL_ACK message to the user interface control module 222.

The user interface control module 222, on receiving this message, puts the current call in a "hold call" list, moves the new call to an "active call" list, and sets a temporary call to "NO_CALL." The user interface control module 222 also sends a M_ACCEPT_CALL message to the MGCP call control module 234 for the new call. The MGCP call control module 234 calls the MGCP stack API to send an "hd" event (EVENT_HD) to the media gateway controller 116. The MGCP stack 244, on receiving remote side SDP information from the media gateway controller 116, sends MEDIA_START_TX and MEDIA_START_RX callback messages to the MGCP call control module 234. The MGCP call control module 234, on reception of these messages, opens the RTP stack instances and the DSP channel and changes to the Communication state 512. For this particular MGCP call, the endpoint 102 changes the voicestatus flag to VOICE_START and the RTPChannelStatus flag to CHANNEL_OPEN. At this point, the MGCP call is established, and the H.323 call is on hold. The speech codecs used for the held call and for the active call can be different, and capabilities matching between the calling and the called party may be used.

In some embodiments, each time a new call comes in, different RTP ports are assigned to the call. For example, port numbers 8002, 8003 may be assigned for the H.323 call, and port numbers 8004, 8005 may be assigned for the MGCP call. Also, UDP sockets for a "held" call may remain open. Any packets received at those sockets may be discarded and not sent to the DSP 204 for processing. In particular embodiments, H.323 uses H.450.4 for the call hold feature. The H.450.4 standard discloses both consulting and without consulting call hold features, and either of these two techniques could be used by the endpoint 102. If a "held" remote party continues to send RTP packets to the channel, the packets may be discarded as the voice status for that particular call is VOICE_STOPPED.

Returning to the above example, the H.323 call is on hold, and the MGCP call is active. When the user wants to restore the H.323 call, the user presses the "Hold" button on the endpoint 102. The DSP 204 detects this and informs the user interface control module 222. The user interface control module 222 receives the message from the DSP 204 in the Call state 306 and changes to the Holding state 318. The user interface control module 222 also sends a M_HOLD_CALL message to the current call's call control module (in this example, the MGCP call control module 234). The MGCP call control module 234 closes the DSP channels for the active call, sends a M_HOLD_CALL_ACK message to the user interface call control module 222, and changes from the Communication state 512 to the Held state 522.

The user interface control module 222, on receiving the M_HOLD_CALL_ACK message, checks if there are any calls on hold. In this example, the H.323 call is on hold. The user interface control module 222 puts the current MGCP call in the "hold call" list and puts the held call in the "active call" list. If there are no calls on hold, the user interface control module 222 puts the current MGCP call in the "hold call" list, puts "NO_CALL" in the "active call" list, and changes state to the Dialing state 304 to dial a new outgoing call.

In this example, since an H.323 call was put on hold, the user interface control module 222 enters the Restoring state 320. A M_RESTORE_CALL message is sent to the H.323 call control module 230 to restore the H.323 call. On receiving this message in the Held state 420, the H.323 call control module 230 sends a VOICE_RESTORE_CHANNEL message to the voice manager 236 and changes state to the Restoring state 422. The voice manager 236, on successfully restoring the voice channel, sends a VOICE_RESTORE_CHANNEL_ACK message to the H.323 call control module 230. The H.323 call control module 230 requests the DSP 204 to open the voice channels, changes state to the Wait Open Voice Channel state 410, and sends a M_RESTORE_CALL_ACK message to the user interface control module 222. On receiving a DSP_OPEN_ACK message from the DSP 204 for successfully opening the channels, the voicestatus flag is changed to VOICE_START and the RTPChannelStatus flag is changed to CHANNEL_OPEN. Also, the state of the H.323 call control module 230 changes from the Wait Open Voice Channel state 410 to the Communication state 412.

When the user interface control module 222 receives the M_RESTORE_CALL_ACK message from the H.323 call control module 230, the user interface control module 222 changes from the Restoring state 320 to the Call state 306. At this point, the held H.323 call is restored, and the MGCP call is put on hold. To restore the held MGCP call, the same procedure as explained above is done.

If no other call is on hold when the user presses the "Hold" button to place a first call on hold, the user interface control module 222 changes from the Call state 306 to the Dialing state 304. This allows the user to establish a second call. To establish a new call, the user selects the type of outgoing call and then enters the telephone number. The DTMF tones are detected by the DSP 204 and, depending upon the type of outgoing call, the corresponding stack API is called to place the new call. For example, the user may be talking on an H.323 call and decide to put a SIP terminal in a three-party conference. To do so, the user presses the "SIP" button and then dials a SIP user agent 108a-108b.

In some embodiments, since this is a second call, during media negotiation, different RTP/RTCP port numbers are offered for voice communications. In particular embodiments, the RTP/RTCP port numbers are allocated on a per channel and per call basis, such as when RTP/RTCP port numbers are reserved in a double dimensional array like RTPPort[Channel][Call]. Thus, the SIP communications take place on RTPPort[Channel=0][Call=1] and for the held H.323 call on RTPPort[Channel=0][Call=0]. For the held H.323 call, the received RTP packets may be discarded as the voicestatus flag is marked as VOICE_STOPPED.

Figure 6:
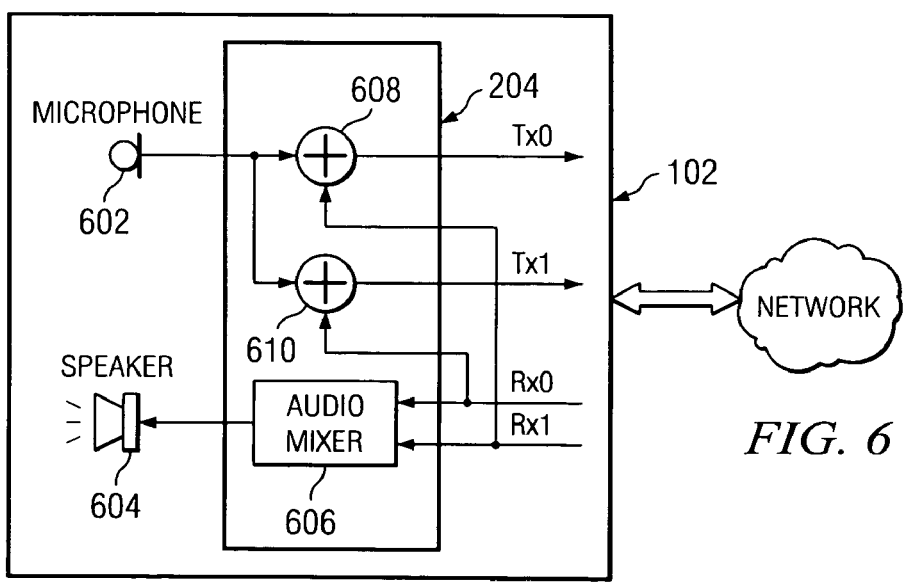
FIG. 6 illustrates an example digital signal processor for handling call conferencing using multiple protocols according to one embodiment of this disclosure.

At this moment, the user may press a "three-party" function button or sequence of buttons to initiate multi-party conferencing. When the user does so, the held H.323 call is restored in a similar manner as explained above, and RTP packets received for both calls are sent to the DSP 204 for decoding and playback. One example mechanism for handling a conference call in the DSP 204 is shown in FIG. 6, which is described below.

As described above, when the user interface control module 222 receives an Incoming Call message, the user interface control module 222 checks the availability of a free call. In some embodiments, the user can configure the number of available maximum calls per channel or per protocol.

If there is no free call available, a TC_EVENT (cancelled) message is sent to the appropriate call control module 230-234. On receiving this message, the state machine of the call control module is reset to the Standby state, and the <Protocol>CallReject API is invoked. This API sends, for example, an H.323 RELEASE COMPLETE message or a SIP CANCEL message with a reason of "Busy".

When an MGCP call ends (such as when a remote party disconnects), the MGCP call control module 234 receives a Delete Connection (DLCX) message along with a play busy signal (SIGNAL_BZ) command from the media gateway controller 116, and the RTP instances are stopped. The DSP channels are also closed, and the state machine 500 is changed to the Standby state 502. This remote disconnect message is forwarded to the user interface control module 222, which changes state to the Busy Tone state 308 and plays busy tone to the user. After a timeout, the state is changed to the Wait On Hook state 310. When the user goes on-hook, the state changes to the Standby state 302.

By performing the various functions described above, an Interworking Gateway or switch is not needed to perform the bridging between the different signaling messages. Also, the remote endpoints need no special implementation other than the call establishment mechanism as defined in one or more of the H.323, SIP, and MGCP standards. The use of a three-party conference is used above as an example. The same principle could be extended to any number of participants and may be limited only by available computing resources.

FIG. 6 illustrates an example digital signal processor 204 for handling call conferencing using multiple protocols according to one embodiment of this disclosure. In particular, the DSP 204 shown in FIG. 6 facilitates call conferencing even when the other endpoints involved in a conference call use different signaling protocols and speech codecs. The embodiment of the DSP 204 shown in FIG. 6 is for illustration only. Other embodiments of the DSP 204 may be used without departing from the scope of this disclosure. Also, for ease of explanation, the DSP 204 is described with respect to the endpoint 102 of FIG. 2. The DSP 204 could be used by any other suitable device.

In this example, the endpoint 102 includes a microphone 602 and a speaker 604. The microphone 602 captures audio information at the endpoint 102, such as words spoken by a user of the endpoint 102. The speaker 604 provides audio information to the user of the endpoint 102, such as audio information received from other parties involved in a conference call.

As shown in FIG. 6, the DSP 204 receives two input streams Rx0 and Rx1 and produces two output streams Tx0 and Tx1. Each of the input streams represents audio information from another endpoint in the system 100. For example, the first input stream Rx0 could represent a stream provided by the H.323 endpoint 106a, and the second input stream Rx1 could represent a stream provided by the media gateway 110. Also, each of the input streams may use different or common speech codecs or compression algorithms. Similarly, each of the output streams represents audio information provided to another endpoint in the system 100. For example, the output streams Tx0 and Tx1 could represent streams provided to the H.323 endpoint 106a and the media gateway 110, respectively.

In this example, the DSP 204 includes an audio mixer 606. The audio mixer 606 mixes the input streams and provides a mixed signal to the speaker 604 for presentation to the user. For example, in the endpoint 102 of FIG. 2, the DSP 204 may decode the payload of RTP packets received from two or more remote endpoints using the appropriate speech decoder, use the audio mixer 606 to mix decoded Pulse-Code Modulation (PCM) samples, and provide the mixed samples to the speaker 604. In this way, the user of the endpoint 102 will hear each of the parties using the remote endpoints during a conference call.

Depending on the implementation of the remote endpoints, the remote endpoints in a conference call may lack the ability to communicate directly with one another. For example, the H.323 endpoint 106a and the media gateway 110 may lack the ability to communicate directly with one another and exchange voice information. To allow a party using one of the remote endpoints to hear a party using another of the remote endpoints during a conference call, the DSP 204 includes combiners 608-610.

In this example, the combiners 608-610 combine the audio information in an audio stream from the microphone 602 with the audio information from one of the input streams. For example, the combiner 608 produces the first output stream Tx0 by combining the audio stream from the microphone 602 with the second input stream Rx1. Similarly, the combiner 610 produces the second output stream Tx1 by combining the audio stream from the microphone 602 with the first input stream Rx0.

By doing this, a first remote endpoint that receives the first output stream Tx0 is actually receiving audio information from the endpoint 102 and audio information from a second remote endpoint (the Rx1 stream). The second remote endpoint receives the second output stream Tx1, which is actually audio information from the endpoint 102 and audio information from the first remote endpoint (the Rx0) stream. This allows the DSP 204 to provide each remote endpoint with the audio information from another remote endpoint. As a result, the remote endpoints may participate in a conference call even if they cannot communicate with one another or when a multipoint conferencing unit (which usually performs the mixing for multi-party conferencing in a packet-based network) is absent.

As an example, assume that the endpoint 102 is engaged in a conference call with the H.323 endpoint 106a and the media gateway 110. The H.323 endpoint 106a and the media gateway 110 may not be able to exchange voice information during the conference call. To support the conference call, the endpoint 102 provides the H.323 endpoint 106a with audio information from the endpoint 102 and from the media gateway 110. The endpoint 102 also provides the media gateway 110 with audio information from the endpoint 102 and from the H.323 endpoint 106a. In this way, each party to the conference call may hear all other parties to the conference call, even when the endpoints in the conference call use different protocols and different speech codecs.

Although FIG. 6 illustrates one example of a digital signal processor 204 for handling call conferencing using multiple protocols and different speech codecs, various changes may be made to FIG. 6. For example, in FIG. 6, the functionality of a telephone 104 is incorporated into the endpoint 102. In other embodiments, the microphone 602 and the speaker 604 may reside outside the endpoint 102. Also, the number of input streams, output streams, and combiners is for illustration only. Any suitable number of input streams, output streams, and/or combiners may be used in the DSP 204.

Figure 7:
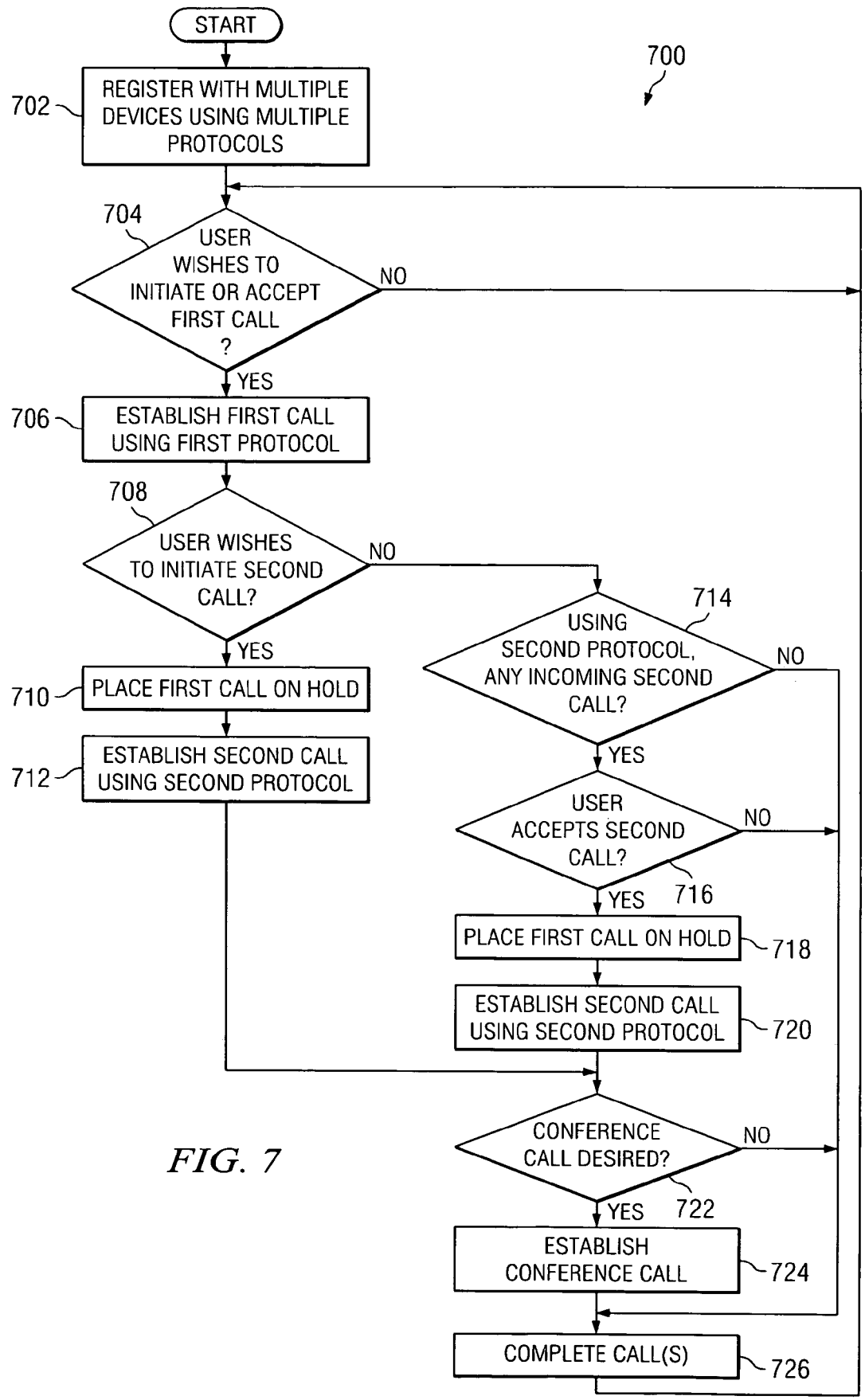
FIG. 7 illustrates an example method for providing communication services using multiple signaling protocols according to one embodiment of this disclosure.

FIG. 7 illustrates an example method 700 for providing communication services using multiple signaling protocols according to one embodiment of this disclosure. For ease of explanation, the method 700 is described with respect to the endpoint 102 of FIG. 2 operating in the system 100 of FIG. 1. The method 700 could be used by any other suitable device and in any other suitable system.

The endpoint 102 registers with multiple devices using multiple signaling protocols at step 702. This may include, for example, the endpoint 102 registering with an H.323 gatekeeper 112a, a SIP server 114a, and a media gateway controller 116. The endpoint 102 could register with any other or additional devices using any other or additional protocols.

The endpoint 102 determines if the user wishes to initiate or accept a first call at step 704. This may include, for example, the endpoint 102 receiving an incoming call, ringing a telephone 104, and detecting the user answering the telephone 104. This may also include the endpoint 102 detecting the user using the telephone 104 to place an outgoing call. As a particular example, this may include the endpoint 102 detecting the user pressing a button identifying the protocol to be used, followed by a telephone number and the "#" sign. In other embodiments, the protocol to be used may be detected automatically. Also, in other embodiments, no buttons need to be pressed to identify the end of the telephone number.

The endpoint 102 establishes a first telephone call at step 706. This may include, for example, the endpoint 102 communicating any suitable signaling messages needed to establish the first call. The first telephone call may use any suitable protocol, such as H.323, SIP, or MGCP.

The endpoint 102 determines whether the user wishes to place a second telephone call at step 708. This may include, for example, the endpoint 102 detecting the user attempting to place the first telephone call on hold. At this point, there is no incoming second telephone call, so placing the first call on hold likely indicates that the user wishes to place a second call.

The endpoint 102 places the first telephone call on hold at step 710. This may include, for example, the endpoint 102 stopping the transmission of packets containing outgoing voice data and discarding any packets containing incoming voice data for the first telephone call.

The endpoint 102 establishes a second call using a second protocol at step 712. This may include, for example, the endpoint 102 detecting the user pressing a button identifying a protocol to be used, followed by a telephone number and the "#" sign. The second protocol may or may not be the same as the first protocol.

If the user does not initiate a second call at step 708, the endpoint 102 determines if a second incoming call using a second protocol is received at step 714. This may include, for example, the endpoint 102 determining if a message is received indicating that a second telephone call has been placed to the endpoint 102. The type of message received depends on the protocol used by the calling party to place the second telephone call.

If there is an incoming telephone call, the endpoint 102 determines if the user accepts the second telephone call at step 716. This may include, for example, the endpoint 102 providing a call waiting warning to the user. This may also include the endpoint 102 determining if the user presses a button on the telephone 104 to accept the incoming second telephone call. If the user accepts the second call, the endpoint 102 places the first telephone call on hold at step 718, and the endpoint 102 then establishes the second telephone call using the second protocol at step 720.

At some point, the endpoint 102 determines if the user wishes to initiate a conference call at step 722. This may include, for example, the endpoint 102 determining if the user presses a button or button sequence on the telephone 104 identifying the conference function. If the user wishes to establish a conference call, the endpoint 102 establishes a conference call at step 724. This may include, for example, the endpoint 102 establishing a conference call involving the user and all parties associated with the current call and any calls on hold. This may also include the DSP 204 operating as shown in FIG. 6 to provide conferencing functionality to remote endpoints that cannot communicate directly with one another or when a multipoint conferencing unit is not available.

The endpoint 102 allows the current call and/or any calls on hold to complete at step 726. This may include, for example, the endpoint 102 allowing a single telephone call to conclude when one of the parties places a telephone on-hook. This may also include the endpoint 102 allowing a conference call to conclude when multiple parties place their telephones on-hook. In addition, this may include the endpoint 102 allowing the user of the endpoint 102 to restore one or more telephone calls on hold and then terminating the restored calls.

Although FIG. 7 illustrates one example of a method 700 for providing communication services using multiple signaling protocols, various changes may be made to FIG. 7. For example, the endpoint 102 could allow more than two telephone calls involving the endpoint 102 to exist at the same time. Also, as described above, it is possible for multiple telephone calls to use the same protocol. Further, while FIG. 7 illustrates the endpoint 102 providing call waiting, call hold, and call conferencing services, any other or additional services or a subset of these services could be provided by the endpoint 102. In addition, while FIG. 7 illustrates multiple "telephone calls" involving the endpoint 102, any other or additional communication session(s) may be attempted, established, maintained, and completed as part of the method 700.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A communication terminal, comprising:
a phone manager within a packet network endpoint, the phone manager including an interface for a communication line employed by the packet network endpoint to carry analog voice signals during a conference;
a telephony controller within the packet network endpoint, the telephony controller including an interface to each of a plurality of voice-over-Internet Protocol signaling protocols employed by the packet network endpoint during the conference;
an application controller within the packet network endpoint and coupled to the phone manager and the telephony controller, the application controller supporting multi-party conferencing for calls involving two or more of the plurality of signaling protocols; and
a digital signal processor within the packet network endpoint and coupled to the phone manager and the telephony controller, the digital signal processor configured to process audio information during a conference by:
receiving a first audio stream associated with a user of the packet network endpoint;
combining the first audio stream with only a second audio stream from a first remote endpoint coupled to the packet network endpoint by a packet network to form a first combined audio stream, the first remote endpoint using a first signaling protocol;
providing the first combined audio stream to a second remote endpoint coupled to the packet network endpoint by the packet network, wherein the second remote endpoint uses a second signaling protocol different from the first signaling protocol;
combining the first audio stream with only a third audio stream from the second remote endpoint to form a second combined audio stream; and
providing the second combined audio stream to the first remote endpoint.

2. An apparatus, comprising:
a plurality of call controllers within a packet network endpoint, the call controllers capable of establishing a plurality of communication sessions over a packet network using a plurality of signaling protocols;
an application controller within a packet network endpoint, the application controller capable of supporting one or more supplementary services during each of the communication sessions; and
a digital signal processor within a packet network endpoint, the digital signal processor configured to process audio information during a conference by:
receiving a first audio stream associated with a user of a telecommunications device connected to the packet network endpoint;
combining the first audio stream with only a second audio stream from a first remote endpoint coupled to the packet network endpoint by the packet network to form a first combined audio stream, the first remote endpoint using a first signaling protocol;
providing the first combined audio stream to a second remote endpoint coupled to the packet network endpoint by the packet network, wherein the second remote endpoint uses a second signaling protocol different from the first signaling protocol;
combining the first audio stream with only a third audio stream from the second remote endpoint to form a second combined audio stream; and
providing the second combined audio stream to a first remote endpoint.

3. The apparatus of claim 2, wherein:
the communication sessions are associated with a plurality of remote endpoints coupled to the packet network endpoint by the packet network; and
at least two of the remote endpoints implement different signaling protocols.

4. The apparatus of claim 2, wherein:
the application controller comprises a first state machine;
each of the call controllers comprises a second state machine; and
the application controller and the call controllers are capable of using the state machines to establish the communication sessions using multiple protocols and to support the one or more supplementary services.

5. The apparatus of claim 2, further comprising:
a buffer capable of storing audio information to be transmitted over the packet network and audio information received over the packet network; and
a plurality of stacks capable of facilitating communication between the packet network and the call controllers and buffer, wherein the plurality of stacks comprise a Q.931/H.245 stack, a Remote Access Service (RAS) stack, a SIP/Session Description Protocol (SDP) stack, and a MGCP/SDP stack.

6. The apparatus of claim 2, wherein the application controller and at least one of the call controllers are capable of at least one of:
placing at least one of the communication sessions on hold so a user may initiate another of the communication sessions;
placing at least one of the communication sessions on hold so the user may accept another of the communication sessions; and
establishing a conference for at least two of the communication sessions, and
wherein the communication sessions use a common signaling protocol or different signaling protocols.

7. The apparatus of claim 6, further comprising a selection device configured to allow a user to select a signaling protocol for each communication session.

8. The apparatus of claim 2, wherein the call controllers are capable of simultaneously maintaining multiple communication sessions using different signaling protocols.

9. The apparatus of claim 2, wherein the call controllers comprise an H.323 call controller, a Session Initiation Protocol (SIP) call controller, and a Media Gateway Control Protocol (MGCP) call controller that are active simultaneously.

10. The apparatus of claim 9, wherein the call controllers are capable of being simultaneously registered with an H.323 gatekeeper, a SIP server, and a media gateway controller using at least one of: a common Internet Protocol address and a common telephone number.

11. The apparatus of claim 2, wherein each of the call controllers is capable of establishing a single communication session using an associated signaling protocol.

12. The apparatus of claim 5, wherein the plurality of stacks further comprise a Real-Time Transfer Protocol (RTP)/Real-Time Control Protocol (RTCP) stack.

13. The apparatus of claim 2, further comprising:
a line interface capable of being coupled to a telephone through an analog communication line; and
a processor capable of at least one of: performing dual-tone multi-frequency detection, generating one or more audible tones, and supporting one or more voice codecs.

14. A method, comprising:
establishing a plurality of communication sessions to a packet network endpoint over a packet network using a plurality of signaling protocols;
providing one or more supplementary services during each of the communication sessions;
receiving a first audio stream associated with a user at the packet network endpoint;
within the packet network endpoint, combining the first audio stream with only a second audio stream from a first remote endpoint coupled to the packet network endpoint by the packet network to form a first combined audio stream, the first remote endpoint using a first signaling protocol;
providing the first combined audio stream from the packet network endpoint to a second remote endpoint coupled to the packet network endpoint by the packet network, wherein the second remote endpoint uses a second signaling protocol different from the first signaling protocol;
within the packet network endpoint, combining the first audio stream with only a third audio stream from the second remote endpoint to form a second combined audio stream; and
providing the second combined audio stream from the packet network endpoint to a first remote endpoint.

15. The method of claim 14, wherein:
the communication sessions are associated with a plurality of remote endpoints; and
at least two of the remote endpoints implement different signaling protocols and are unable to establish communication sessions directly with one another.

16. The method of claim 14, wherein establishing the communication sessions and providing the one or more supplementary services comprise using, an application controller having a first state machine and a plurality of call controllers each having a second state machine, wherein the application controller and the call controllers are capable of using the state machines to establish the communication sessions using multiple protocols and to support the one or more supplementary services.

17. The method of claim 14, wherein establishing the communication sessions and providing the one or more supplementary services comprise at least one of:
placing at least one of the communication sessions on hold so a user may initiate another of the communication sessions;
placing at least one of the communication sessions on hold so the user may accept another of the communication sessions; and
establishing a conference using at least two of the communication sessions,
wherein the communication sessions use a common signaling protocol or different signaling protocols.

18. The method of claim 17, further comprising:
providing a selection device configured to allow a user to select a signaling protocol for each communication session.

19. The method of claim 14, wherein establishing the communication sessions comprises simultaneously maintaining multiple communication sessions using different signaling protocols.

20. The method of claim 14, wherein the signaling protocols comprise H.323, Session Initiation Protocol (SIP), and Media Gateway Control Protocol (MGCP) that are active simultaneously.

21. The method of claim 20, further comprising registering with an H.323 gatekeeper, a SIP server, and a media gateway controller using at least one of: a common Internet Protocol address and a common telephone number.

22. A computer program embodied on a non-transitory computer readable medium and operable to be executed by a processor, the computer program comprising computer readable program code for:
establishing a plurality of communication sessions to a packet network endpoint over a packet network using a plurality of signaling protocols;
providing one or more supplementary services during each of the communication sessions;
receiving a first audio stream associated with a user at the packet network endpoint;
within the packet network endpoint, combining the first audio stream with only a second audio stream from a first remote endpoint coupled to the packet network endpoint by the packet network to form a first combined audio stream, the first remote endpoint using a first signaling protocol;
providing the first combined audio stream from the packet network endpoint to a second remote endpoint coupled to the packet network endpoint by the packet network, wherein the second remote endpoint uses a second signaling protocol different from the first signaling protocol
within the packet network endpoint, combining the first audio stream with only a third audio stream from the second remote endpoint to form a second combined audio stream; and
providing the second combined audio stream from the packet network endpoint to a first remote endpoint.

23. The computer program of claim 22, wherein:
the communication sessions are associated with a plurality of remote endpoints; and
at least two of the remote endpoints implement different signaling protocols and are unable to establish communication sessions directly with one another.

24. The computer program of claim 22, wherein the computer readable program code for establishing the communication sessions and providing the one or more supplementary services comprise computer readable program code for using a plurality of state machines.

25. The computer program of claim 22, wherein the computer readable program code for establishing the communication sessions and providing the one or more supplementary services comprise computer readable program code for at least one of:
placing at least one of the communication sessions on hold so a user may initiate another of the communication sessions;
placing at least one of the communication sessions on hold so the user may accept another of the communication sessions; and
establishing a conference using at least two of the communication sessions,
wherein the communication sessions use a common signaling protocol or different signaling protocols.

26. The computer program of claim 25, further comprising computer readable program code for reading a selection device, the selection device configured to allow a user to select a signaling protocol for each communication session.

27. The computer program of claim 22, wherein the computer readable program code for establishing the communication sessions comprises computer readable program code for simultaneously maintaining multiple communication sessions using different signaling protocols.

28. The computer program of claim 22, wherein the signaling protocols comprise H.323, Session Initiation Protocol (SIP), and Media Gateway Control Protocol (MGCP) that are active simultaneously.

29. The computer program of claim 28, further comprising computer readable program code for registering with an H.323 gatekeeper, a SIP server, and a media gateway controller using at least one of: a common Internet Protocol address and a common telephone number.

30. An apparatus, comprising:
 a plurality of call controllers within a packet network endpoint, the call controllers capable of establishing a plurality of communication sessions over a packet network using a plurality of signaling protocols; and
 a digital signal processor within the packet network endpoint, the digital signal processor configured to process audio information during a conference by:
  receiving a first audio stream associated with a user;
  combining the first audio stream with a second audio stream from a first remote endpoint to form a first combined audio stream without combining the first and second audio streams with a third audio stream from a second remote endpoint, the first remote endpoint using a first signaling protocol;
  providing the first combined audio stream to the second remote endpoint, wherein the second remote endpoint uses a second signaling protocol different from the first signaling protocol;
  combining the first audio stream with the third audio stream to form a second combined audio stream without combining the first and third audio streams with the second audio stream; and
  providing the second combined audio stream to the first remote endpoint, wherein the call controllers are capable of being simultaneously registered with an H.323 gatekeeper, a Session Initiation Protocol (SIP) server, and a media gateway controller using at least one of: a common Internet Protocol address and a common telephone number.

31. A method, comprising:
registering a packet network endpoint with at least two of an H.323 gatekeeper, a Session Initiation Protocol (SIP) server, and a media gateway controller using at least one of: a common Internet Protocol address and a common telephone number;
establishing a plurality of communication sessions to the packet network endpoint over a packet network using a plurality of signaling protocols;
receiving a first audio stream associated with a user at the packet network endpoint;
within the packet network endpoint, combining the first audio stream with a second audio stream from a first remote endpoint coupled to the packet network endpoint by the packet network to form a first combined audio stream without combining the first and second audio streams with a third audio stream from a second remote endpoint, the first remote endpoint using a first signaling protocol; and
providing the first combined audio stream to the second remote endpoint coupled to the packet network endpoint by the packet network, wherein the second remote endpoint uses a second signaling protocol different than the first signaling protocol;
within the packet network endpoint, combining the first audio stream with the third audio stream to form a second combined audio stream without combining the first and third audio streams with the second audio stream; and
providing the second combined audio stream to the first remote endpoint.

\* \* \* \* \*